(12) United States Patent
Nitzan et al.

(10) Patent No.: US 7,394,382 B2
(45) Date of Patent: Jul. 1, 2008

(54) BATTERY-ASSISTED BACKSCATTER RFID TRANSPONDER

(75) Inventors: Zvi Nitzan, Zofit (IL); Doron Lavee, Karmei Yosef (IL); Gaby Guri, Oranit (IL)

(73) Assignee: Power ID, Petah Tikva (IL)

( * ) Notice: Subject to any disclaimer, the term of this patent is extended or adjusted under 35 U.S.C. 154(b) by 174 days.

(21) Appl. No.: 11/169,736

(22) Filed: Jun. 30, 2005

(65) Prior Publication Data
US 2006/0001525 A1    Jan. 5, 2006

Related U.S. Application Data

(60) Provisional application No. 60/649,561, filed on Feb. 4, 2005, provisional application No. 60/614,552, filed on Oct. 1, 2004, provisional application No. 60/608,118, filed on Sep. 9, 2004, provisional application No. 60/602,342, filed on Aug. 18, 2004, provisional application No. 60/584,141, filed on Jul. 1, 2004.

(51) Int. Cl.
*G08B 13/14* (2006.01)
(52) U.S. Cl. ............... 340/572.8; 340/572.1; 340/572.4; 340/573.1; 340/825.32
(58) Field of Classification Search ............... 340/572.8, 340/572.1, 572.4, 573.1, 825.32
See application file for complete search history.

(56) References Cited

U.S. PATENT DOCUMENTS

| 5,338,625 | A | 8/1994 | Bates et al. |
| 5,649,296 | A | 7/1997 | MacLellan et al. |
| 5,897,522 | A | 4/1999 | Nitzan |
| 6,236,315 | B1 | 5/2001 | Helms et al. |
| 6,243,012 | B1 | 6/2001 | Shober et al. |
| 6,264,709 | B1 | 7/2001 | Yoon et al. |
| 6,329,920 | B1 | 12/2001 | Morrison et al. |
| 6,337,634 | B1 | 1/2002 | O'Toole et al. |
| 6,466,131 | B1 | 10/2002 | Tuttle et al. |
| 6,509,836 | B1 | 1/2003 | Ingram |
| 6,614,392 | B2 * | 9/2003 | Howard ................. 342/357.07 |
| 6,700,491 | B2 | 3/2004 | Shafer |
| 6,741,178 | B1 * | 5/2004 | Tuttle ...................... 340/572.1 |
| 6,914,588 | B2 | 7/2005 | Tsai |
| 6,952,157 | B1 | 10/2005 | Stewart et al. |
| 7,061,382 | B2 | 6/2006 | Claessens et al. |
| 2003/0017804 | A1 | 1/2003 | Heinrich et al. |
| 2003/0097302 | A1 | 5/2003 | Overhultz et al. |
| 2003/0104848 | A1 | 6/2003 | Brideglall |
| 2003/0165744 | A1 | 9/2003 | Schubert et al. |
| 2004/0008112 | A1 | 1/2004 | Carrender |

(Continued)

OTHER PUBLICATIONS

Oct. 21, 2005 International Search Report for PCT/IL2005/000694.

*Primary Examiner*—Tai Nguyen
(74) *Attorney, Agent, or Firm*—Vladimir Sherman; Professional Patent Solutions

(57) ABSTRACT

A radio frequency transponder includes at least one battery, which is coupled to provide electrical power for operating the transponder and at least one antenna, which is configured to receive and backscatter RF interrogation radiation from an interrogation device. An integrated circuit is arranged to store a code including information and, powered only with energy provided by the battery, to vary a radiation characteristic of the antenna responsively to the code so as to modulate the information onto the backscattered radiation.

20 Claims, 12 Drawing Sheets

U.S. PATENT DOCUMENTS

2004/0070500 A1 4/2004 Pratt et al.
2004/0131897 A1 7/2004 Jenson et al.
2004/0132406 A1 7/2004 Scott et al.
2004/0217865 A1 11/2004 Turner
2005/0024187 A1 2/2005 Kranz et al.
2005/0280512 A1 12/2005 Forster

* cited by examiner

US 7,394,382 B2

BATTERY-ASSISTED BACKSCATTER RFID TRANSPONDER

CROSS-REFERENCE TO RELATED APPLICATIONS

This application claims the benefit of U.S. Provisional Patent Application No. 60/584,141, filed Jul. 1, 2004, of U.S. Provisional Patent Application No. 60/602,342, filed Aug. 18, 2004, of U.S. Provisional Patent Application No. 60/608,118, filed Sep. 9, 2004, of U.S. Provisional Patent Application No. 60/614,552, filed Oct. 1, 2004, and of U.S. Provisional Patent Application No. 60/649,561, filed Feb. 4, 2005. These related applications are assigned to the assignee of the present patent application, and their disclosures are incorporated herein by reference.

FIELD OF THE INVENTION

The present invention relates generally to radio frequency identification (RFID) systems, and particularly to battery-assisted backscatter RFID transponders, their components and methods for producing RFID transponders.

BACKGROUND OF THE INVENTION

Radio frequency identification (RFID) systems are used in a variety of applications, ranging from warehouse inventory control and container tracking, through automatic toll payment, to automatic supermarket cashier applications. In a typical RFID system, an RF transponder is attached to, or incorporated into, a tracked object. RF transmissions between an interrogation device or a reader and the transponder are used for identifying or controlling the object, reading data, writing data or otherwise communicating with the transponder.

SUMMARY OF THE INVENTION

RF transponders are commonly classified in terms of the use they make of an internal power source. A passive transponder has no internal power source and uses the energy of the RF radiation transmitted by the reader (referred to herein as interrogation radiation) for powering the transponder circuitry and for transmitting response radiation back to the reader. (The response radiation typically comprises information, such as an identification number, transmitted from the transponder to the reader.) An active transponder comprises an internal power source that is used for both powering the transponder and for generating the RF energy required for transmitting the response radiation. A battery-assisted transponder (also referred to as a semi-active or a semi-passive transponder) comprises an internal power source. The energy of the response radiation is derived from the interrogation radiation provided by the reader, and the transponder circuitry is powered by the internal power source. Some battery-assisted transponders, referred to as backscatter transponders, generate the response radiation by backscattering the interrogation radiation from the transponder antenna. Backscatter transponders typically transmit information to the reader by modulating the backscattered radiation.

Battery-assisted backscatter transponders, as described in the background art, can use part of the energy of the received interrogation radiation for powering the transponder circuitry, in parallel to their internal battery. This configuration reduces the amount of energy that is available for backscattering, thus reducing the achievable communication range of the transponder.

Embodiments of the present invention provide improved battery-assisted backscatter RF transponder configurations that maximize the achievable communication range and extend the lifetime of the internal power source. Exemplary performance measurements of such transponders in various challenging test environments are shown hereinbelow.

In some embodiments, an integrated circuit (IC) in the transponder modulates the information to be transmitted to the reader onto the backscattered radiation using backscatter modulation. The IC modulates a radar cross-section (RCS) of the transponder antenna by varying the impedance at the feed-point of the antenna. In particular, when an extreme mismatch, such as an open circuit, is introduced at the antenna feed-point, the energy of the interrogation radiation available for backscattering is maximized, thus maximizing the communication range of the transponder.

In some embodiments, the antenna and the IC are jointly optimized so as to maximize the impedance mismatch at the antenna feed-point, and hence maximize the achievable communication range. Additionally or alternatively, a modulation depth (denoted $\Delta RCS$) defined as the ratio between the different RCS values is also maximized.

The RF transponders described herein can operate under various protocols, such as, but not limited to various transponder-talks-first (TTF) and reader-talks-first (RTF) protocols. Such protocols typically define the different modes of operation for the transponder. In some embodiments, an energy saving (battery saving) module in the IC activates and deactivates parts of the transponder responsively to the operational modes defined in the protocol, in order to reduce the energy consumption from the internal power source. In some embodiments, the energy saving module controls the operational modes of the transponder responsively to predetermined timeout conditions, to further reduce energy consumption.

Embodiments of the present invention also provide improved methods for producing RF transponders. In some embodiments, the power source of the transponder is a thin and flexible battery that is printed on the same substrate as the IC and the antenna, as part of the transponder production process.

There is therefore provided, in accordance with an embodiment of the present invention, a radio frequency (RF) transponder, including:

at least one battery, which is coupled to provide electrical power for operating the transponder;

at least one antenna, which is configured to receive and backscatter RF interrogation radiation from an interrogation device; and an integrated circuit (IC), which is arranged to store a code including information and, powered only with energy provided by the battery, to vary a radiation characteristic of the antenna responsively to the code so as to modulate the information onto the backscattered_radiation.

In some embodiments, the transponder includes a substrate having at least one of the IC, the at least one antenna and the at least one battery disposed thereon.

In a disclosed embodiment, the at least one battery includes at least a printed anode layer, a printed electrolyte layer and a printed cathode layer disposed in at least one of a co-planar and a co-facial configuration. The electrolyte layer is disposed between the anode layer and the cathode layer. In another embodiment, the substrate is flexible.

In yet another embodiment, the transponder has a thickness no greater than 1 mm and a bending radius no greater than 25 mm.

In an embodiment, the transponder is attached to an object and at least part of the information in the IC is related to the object. Additionally or alternatively, the transponder is adapted to be attached around a corner of an object so that the at least one battery is oriented in a first plane and the at least one antenna is oriented in a second plane different from the first plane.

In another embodiment, the at least one antenna is selected from the group consisting of at least one of a monopole, a bent monopole, a dipole, a bent dipole, a patch, an array antenna and a combination thereof. Additionally or alternatively, the at least one antenna is configured to receive and backscatter the interrogation radiation in one of an ultra-high frequency (UHF) range and a microwave frequency range. Further additionally or alternatively, the at least one antenna is arranged to receive and backscatter transverse electromagnetic (TEM) radiation.

In yet another embodiment, the at least one antenna includes a feed-point, the radiation characteristic includes a radar cross-section (RCS) of the at least one antenna, and the IC is arranged to vary a load impedance at the feed-point of the at least one antenna so as to vary the RCS of the at least one antenna between two or more different RCS values. In still another embodiment, the IC includes a solid-state switch operatively coupled to the feed-point of the at least one antenna, which is arranged to switch the load impedance between a first impedance and a second impedance, responsively to a binary representation of the code.

In an embodiment, the IC is arranged to introduce a low resistive load condition at the feed-point of the at least one antenna so as to maximize at least one of the two or more RCS values, thereby maximizing a communication range of the transponder. Additionally or alternatively, the IC is arranged to maximize a modulation depth defined as a ratio between two of the two or more RCS values. Further additionally or alternatively, the at least one antenna and the IC are arranged to jointly maximize the modulation depth and a communication range of the transponder.

In an embodiment, the interrogation radiation received by the at least one antenna has a first power level, and the at least one antenna and the IC are arranged to backscatter the interrogation radiation at a second power level that is greater than 75% of the first power level. In another embodiment, the second power level is greater than 95% of the first power level.

In still another embodiment, the IC is configured to comply with an operation protocol defining two or more operational modes. Additionally or alternatively, the IC includes an energy saving module, which is arranged to activate and deactivate parts of the transponder responsively to the operational modes so as to reduce an energy consumption from the at least one battery. In yet another embodiment, the protocol includes at least one of a transponder-talks-first (TTF) and a reader-talks-first (RTF) protocol.

In an embodiment, the protocol includes the RTF protocol, and the IC is configured to analyze signals carried by the interrogation radiation, to progressively activate components of the transponder responsively to the analyzed signals so as to reduce an energy consumption from the at least one battery, to assess a relevance of the interrogation radiation to the transponder based on the analyzed signals, and to enable the transponder to react to the interrogation radiation based on the relevance. Additionally or alternatively, the IC is arranged to evaluate one or more timeout conditions and to deactivate predetermined components of the transponder responsively to the timeout conditions after having detected a presence of the interrogation radiation.

In another embodiment, the IC includes a battery status indicator, which is configured to indicate an availability of sufficient electrical power from the at least one battery, and the IC is configured to draw electrical power from the interrogation radiation responsively to a reported unavailability of sufficient battery power as determined by the battery status indicator.

In yet another embodiment, the transponder includes at least one sensor, and the IC is arranged to receive an indication of a local condition in a vicinity of the transponder from the at least one sensor.

In still another embodiment, the transponder includes an energy conversion circuit, which is arranged to draw excess power from the interrogation radiation, when the excess power is available, and to perform at least one of powering the IC and charging the at least one battery using the drawn excess power.

In an embodiment, the IC is arranged to decode and react to interrogation data carried by the interrogation radiation, the interrogation data including at least one of a command relating to an operation of the transponder and input data to be written to the transponder.

There is also provided, in accordance with an embodiment of the present invention, a radio frequency (RF) transponder, including:

a battery, which is coupled to provide electrical power for operating the transponder;

an antenna, which is arranged to receive and backscatter RF interrogation radiation from an interrogation device;

an integrated circuit (IC), which is arranged to store a code including information and, powered with energy provided by the battery, to vary a radiation characteristic of the antenna responsively to the code so as to modulate the information onto the backscattered interrogation radiation; and a substrate, on which the battery, IC and antenna are disposed, and which is adapted to be fixed around a corner of an object so that the battery is oriented in a first plane and the antenna is oriented in a second plane different from the first plane.

There is further provided, in accordance with an embodiment of the present invention, a radio frequency (RF) transponder, including:

an antenna, which is arranged to receive interrogation radiation at a first power level from an interrogation device and to backscatter the interrogation radiation at a second power level that is greater than 75% of the first power level; and an integrated circuit (IC), which is arranged to store a code including information and to vary a radiation characteristic of the antenna responsively to the code so as to modulate the information onto the backscattered radiation.

In an embodiment, the second power level is greater than 95% of the first power level.

There is additionally provided, in accordance with an embodiment of the present invention, a radio frequency (RF) transponder, including:

an antenna, which is arranged to receive first RF radiation carrying signals from an interrogation device and to transmit second RF radiation responsively to the first RF radiation;

a battery, which is coupled to provide electrical power for operating the transponder; and an integrated circuit (IC), which is operative in accordance with a reader-talks-first (RTF) protocol, and which is configured to detect a presence of the first RF radiation, to analyze the signals carried by the first RF radiation, to progressively activate components of the transponder responsively to the analyzed signals so as to reduce an energy consumption from the battery, to assess a relevance of the first RF radiation to the transponder based on the analyzed signals, and to enable the transponder to transmit the second RF radiation based on the relevance.

In an embodiment, the IC is configured to assess the relevance of the first RF radiation by performing at least one of detecting a pattern in the first RF radiation and determining addressing information in the first RF radiation. In another embodiment, the IC is arranged, responsively to the relevance of the first RF radiation, to perform at least one of rejecting RF radiation not generated by an RF reader and rejecting RF radiation not addressed to the transponder.

There is also provided, in accordance with an embodiment of the present invention, a method for transmitting information from a radio frequency (RF) transponder, including:
  providing a battery for operating the transponder;
  configuring an antenna to backscatter RF interrogation radiation that is transmitted from an interrogation device; and
  varying a radiation characteristic of the antenna responsively to the information so as to modulate the information onto the backscattered radiation. The energy used to vary the radiation characteristic is not derived from the interrogation radiation.

In an embodiment, providing the battery includes applying a printed battery to a substrate having at least one of the IC and the antenna disposed thereon. In another embodiment, the battery is no greater than 1 mm thick.

In yet another embodiment, the battery includes a flexible thin-layer open liquid-state electrochemical cell including a first layer of insoluble negative electrode, a second layer of insoluble positive electrode and a third layer of aqueous electrolyte, the third layer being disposed between the first and second layers and including:
  (a) a deliquescent material for keeping the open cell wet at all times;
  (b) an electroactive soluble material for obtaining required ionic conductivity; and
  (c) a water-soluble polymer for obtaining a required viscosity for adhering the first and second layers to the third layer.

There is additionally provided, in accordance with an embodiment of the present invention, a method for manufacturing a radio frequency (RF) transponder, including:
  providing a battery for operating the transponder;
  configuring an antenna to backscatter RF interrogation radiation that is transmitted from an interrogation device;
  disposing the antenna and the battery on a substrate, wherein the substrate is configured to allow for application of the transponder around a corner of an object, so that the battery is oriented in a first plane and the antenna is oriented in a second plane different from the first plane.

There is further provided, in accordance with an embodiment of the present invention, a method for transmitting information from a radio frequency (RF) transponder, including:
  configuring an antenna to receive an interrogation radiation at a first power level from an interrogation device and to backscatter the interrogation radiation at a second power level that is greater than 75% of the first power level;
  storing a code including the information; and
  varying a radiation characteristic of the antenna responsively to the code so as to modulate the information onto the backscattered radiation.

In an embodiment, the second power level is greater than 95% of the first power level.

There is additionally provided, in accordance with an embodiment of the present invention, a method for manufacturing a radio frequency (RF) transponder, including:
  providing a substrate;
  applying on the substrate an antenna suitable for backscattering radio-frequency (RF) radiation;
  applying an integrated circuit (IC) to the substrate, and coupling the IC to vary a radiation characteristic of the antenna so as to modulate information onto the backscattered radiation; and
  printing a battery on the surface of the substrate, so as to provide electrical power for powering the transponder.

In an embodiment, printing the battery includes printing one or more battery layers in at least one of a co-facial configuration and a co-planar configuration using respective inks including battery layer materials. In another embodiment, the layer material includes at least one of zinc, manganese dioxide ($MnO_2$) and zinc chloride ($ZnCl_2$).

In yet another embodiment, printing the battery includes:
  forming a first battery assembly including:
    i. printing a first electrode layer on the surface of the substrate;
    ii. applying an electrolyte on the first electrode layer; and
    iii. applying a separator layer on the electrolyte of the first electrode layer;
  forming a second battery assembly including:
    i. printing a second electrode layer of opposite polarity to the first electrode layer on a second substrate; and
    ii. applying the electrolyte on the second electrode layer; and
  joining together the first battery assembly and second battery assembly so that the layers are stacked and the electrolyte of the second electrode layer is in co-facial contact with the separator layer.

In still another embodiment, applying the antenna includes printing the antenna on the substrate. In another embodiment, the IC includes an organic polymer IC and applying the IC includes using a printing technique to apply the IC. Additionally or alternatively, applying the antenna and the IC and printing the battery include printing a fully printable transponder.

There is also provided, in accordance with an embodiment of the present invention, a method for reducing energy consumption from a battery in a radio-frequency (RF) transponder operating in accordance with a reader-talks-first (RTF) protocol, including:
  detecting a presence of RF radiation at the transponder;
  analyzing signals carried by the detected RF radiation;
  progressively activating components of the transponder responsively to the analyzed signals, so as to reduce the energy consumption;
  assessing a relevance of the RF radiation to the transponder based on the analyzed signals; and
  based on the relevance, enabling the transponder to react to the RF radiation.

There is further provided, in accordance with an embodiment of the present invention, a radio-frequency identification (RFID) system, including:
  at least one interrogation device, which is configured to transmit RF interrogation radiation to RF transponders and to receive and decode backscatter-modulated radiation from the RF transponders responsively to the interrogation radiation;

at least one radio frequency (RF) transponder, including:
i. at least one battery, which is coupled to provide electrical power for operating the transponder;
ii. at least one antenna, which is arranged to receive and backscatter the interrogation radiation from the at least one interrogation device; and
iii. an integrated circuit (IC), which is arranged to store a code including information and, powered only with energy provided by the battery, to vary a radiation characteristic of the antenna responsively to the code so as to modulate the information onto the backscattered radiation; and at least one data processing device for processing data decoded by the at least one interrogation device from the backscattered modulated radiation.

There is additionally provided, in accordance with an embodiment of the present invention, an antenna for transmitting information from a radio frequency (RF) transponder. The antenna is configured to receive RF interrogation radiation at a first power level from an interrogation device, to backscatter the interrogation radiation at a second power level that is greater than 75% of the first power level, and the antenna has a variable radiation characteristic, which is controllable by the transponder so as to modulate the information onto the backscattered radiation. In an embodiment, the second power level is greater than 95% of the first power level.

There is also provided, in accordance with an embodiment of the present invention, an energy saving circuit for reducing energy consumption from a battery in a radio-frequency (RF) transponder, including:
a state machine, which is arranged to detect a presence of RF radiation at the transponder, to analyze signals carried by the detected RF radiation, to progressively activate components of the transponder responsively to the analyzed signals, so as to reduce the energy consumption, to assess a relevance of the RF radiation to the transponder based on the analyzed signals, and, based on the relevance, to enable the transponder to react to the RF radiation; and
one or more timeout circuits, which are arranged to evaluate timeout conditions so as to activate predetermined components of the transponder responsively to the analyzed signals.

There is further provided, in accordance with an embodiment of the present invention, a radio frequency (RF) transponder, including:
at least one battery, which is coupled to provide electrical power for operating the transponder;
at least one antenna, which is configured to receive and backscatter RF interrogation radiation from an interrogation device; and
an integrated circuit (IC), which is arranged to store a code including information and, powered with at least one of energy provided by the battery and excess power from the interrogation radiation, to vary a radiation characteristic of the antenna responsively to the code so as to modulate the information onto the backscattered radiation.

The present invention will be more fully understood from the following detailed description of the embodiments thereof, taken together with the drawings in which:

DETAILED DESCRIPTION OF EMBODIMENTS

System Description

Figure 1:
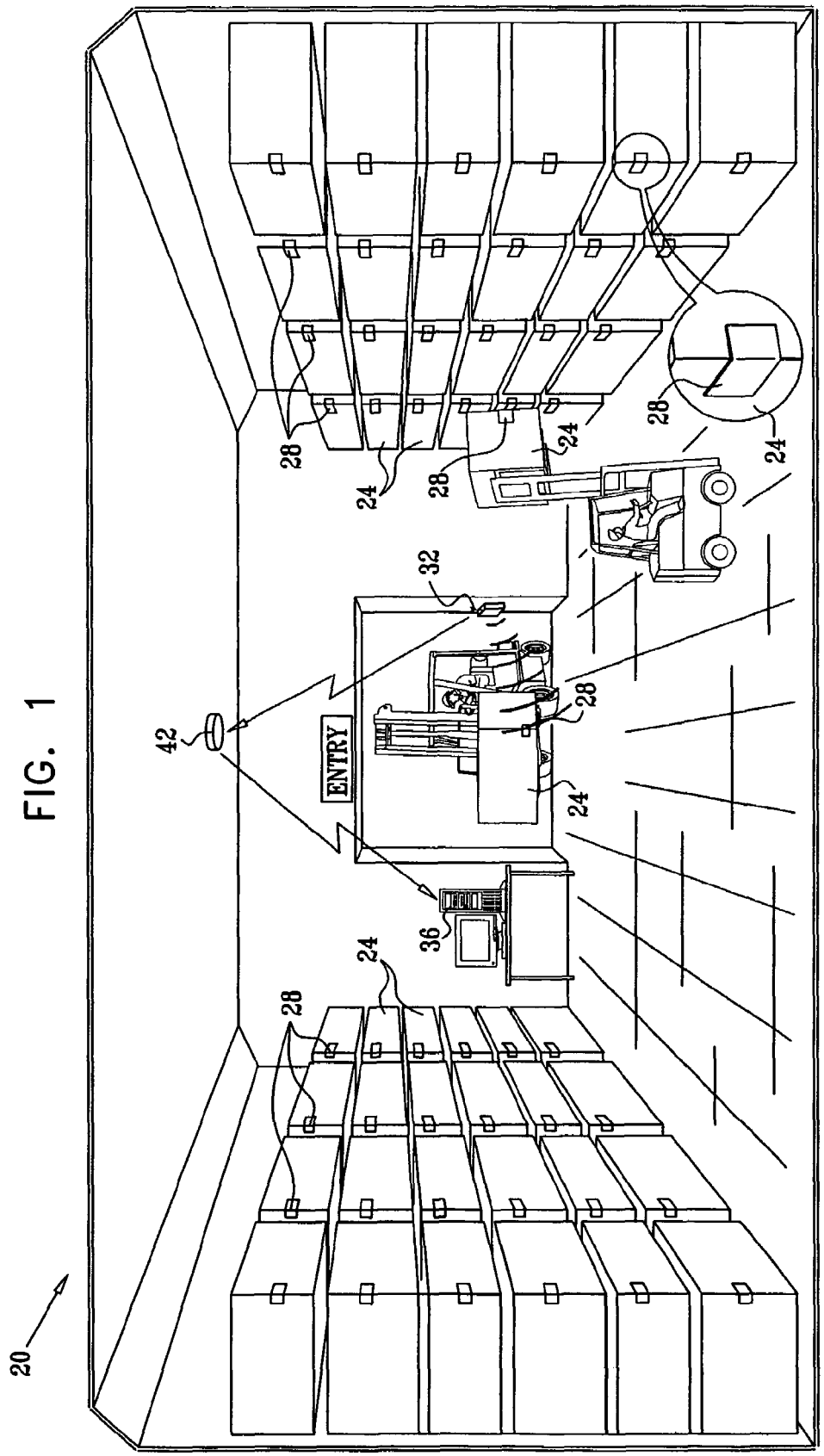
FIG. 1 is a schematic pictorial illustration of an RFID system, in accordance with an embodiment of the present invention.

FIG. 1 is a diagram that pictorially illustrates an RFID system 20, in accordance with an embodiment of the present invention. System 20 in this example, which is no way limiting is a warehouse inventory tracking system, in which objects, such as packages 24 are stored and tracked in a warehouse. An RF transponder 28, typically in the form of a tag or label, is attached to or is integrally formed with each package 24. The term "transponder" as used herein includes, but is not limited to, transponder forms such as tags, labels, stickers, wristbands, smart cards, disks or coins, glass transponders, plastic housing transponders, watch face transponders and any combination thereof. The term includes any size, thickness, shape, and form of transponder device. The term includes integrated and non-integrated devices, such as, but not limited to, devices integrated into the packaging of an object or integrated into the object or product itself. The term includes transponders, made by any suitable technology, including, but not limited to a printing technology.

A code comprising information relating to package 24 and/or to transponder 28 can be generated and stored in a memory of transponder 28. Generally speaking, the code comprises any information that is to be transmitted from transponder 28 to reader 32. For example, the information may comprise an ID number that identifies package 24. Additionally or alternatively, the code may comprise data measured by sensors coupled to the transponder, or any other data that should be transmitted to reader 32.

An interrogation device, such as a reader 32, transmits interrogation RF radiation to transponder 28 in order to query its information. Typically, the interrogation radiation comprises a transverse electromagnetic (TEM) wave. The interrogation radiation may comprise interrogation data transmitted to the transponder, such as an identification of the reader or an identification of the queried transponder. The transponder receives the interrogation radiation and responds by modulating its code onto a backscattered response RF radiation, using methods, which will be explained in detail below. The reader receives the backscattered radiation and demodulates the code sent by the transponder. The information in the code can be transmitted to a processing unit 36. In some embodiments, at least one repeater 42 can be used for communicating between reader 32 and processing unit 36, for example in installations where there is no line of sight between the reader and the processing unit.

In the example of FIG. 1, a forklift is seen entering the warehouse carrying a new package 24 to be stored. Reader 32, in this example configured as a gate reader, interrogates transponder 28 attached to package 24 in order to automatically update an inventory database maintained by processing unit 36 with the newly-arriving package.

The configuration shown in FIG. 1 is an exemplary RFID application, chosen purely for the sake of conceptual clarity. System 20 may comprise any other RFID system, in which RFID transponders are coupled to tracked objects. System 20 may comprise, for example, a container tracking system, an automatic toll payment system, a book tracking system in a library, an airport baggage tracking system, an automatic cashier in a supermarket, animal tagging, human tracking such as, but not limited to baby tracking in a hospital or armed forces tracking, supply chain management, access control, asset control, total asset visibility, licensing, product handshaking, logistics management, movement and theft alarms. System 20 of the present invention can be used to monitor assets, packages, containers, and pallets when they are in warehouses and stockyards, as well as when they are in transit.

System 20 typically comprises multiple transponders 28 and may comprise multiple readers 24 and/or multiple processing units. Reader 32 and transponder 28 may communicate using any suitable protocol. An exemplary protocol is defined in an EPCglobal specification entitled "Class-1 Generation-2 UHF RFID Conformance Requirements Specification v.1.0.2," which is available at www.epcglobalinc.org/standards_technology/specifications.html. Another exemplary protocol is the ISO 18000-6:2004 standard entitled "Radio Frequency Identification for Item Management—Part 6: Parameters for Air Interface Communications at 860 MHz to 960 MHz," published by the International Organization for Standardization (ISO). The ISO/IEC 18000-6:2004 standard is available at www.iso.org.

The modes of operation of transponder 28 and the functionality of each mode can be defined in accordance with any suitable protocol, standard or interoperability interface, such as the EPCglobal and ISO specifications cited above.

In some embodiments, system 20 may comprise multiple readers 32. The multiple readers may be synchronized or non-synchronized. The multiple readers may be connected to a single processing unit 36 or to multiple processing units. Interrogation radiation from more than one reader may cause mutual interference problems. In some embodiments, readers 32 of system 20 can use a "listen before talk" protocol in order to avoid the mutual interference. Additionally or alternatively, readers 32 can use synchronized or non-synchronized frequency hopping for minimizing interference, as is known in the art.

Reader 32 and processing unit 36 may communicate using any suitable wired or wireless connection means. Although system 20 can be used in any RFID application, the methods and devices described below are particularly suitable for RFID applications that require a relatively long range between transponder 28 and reader 32. In addition, system 20 can be used in a variety of challenging environments, such as environments in which the communication path between the transponder and the reader is obstructed by materials such as oil, liquids and metals.

Transponder 28 as described herein is a battery-assisted backscatter RFID transponder. The term "backscatter transponder" means that the response radiation is generated by a backscattering effect, in which part of the RF energy of the interrogation radiation is reflected from the transponder antenna back to the reader. Further, transponder 28 does not draw current from an internal battery for generating the RF energy required for transmitting the backscattered radiation, thus extending the lifetime of the battery and of the transponder.

The term "battery-assisted transponder" (sometimes also referred to as a "semi-active" or a "semi-passive" transponder) means that power required to run transponder 28 is derived from an internal power source, such as a battery. In contrast, a passive transponder does not make use of an internal power source. The energy for powering the transponder circuitry in a passive transponder is derived from the interrogation radiation, which effectively reduces the communication range.

Other transponders, referred to as "active transponders," use the power of the internal battery for generating the response radiation. While this configuration may extend the communication range of the transponder, the power consumption of an active transponder is significantly higher in comparison to a battery-assisted transponder. The higher power consumption typically means that an active transponder may either have a significantly shorter lifetime, or have a significantly larger size to allow for a larger battery. A larger battery also adds to the cost of the transponder.

The background art has described semi-active transponders, in which some of the energy of the interrogation radiation received by the antenna is transferred to the transponder, absorbed or otherwise made unavailable for backscattering. Since such a configuration reduces the energy that is available for backscattering, the communication range of the transponder is reduced accordingly. However, in embodiments described herein, the control circuitry of the transponder is powered exclusively by the internal battery. As long as the battery is able to supply the required energy, the energy of the interrogation radiation is not used to power the transponder. Substantially all of the energy of the interrogation radiation received by the antenna is thus available for backscattering. Therefore, the configuration described herein maximizes the backscatter communication range between the transponder and the reader.

Figure 8:
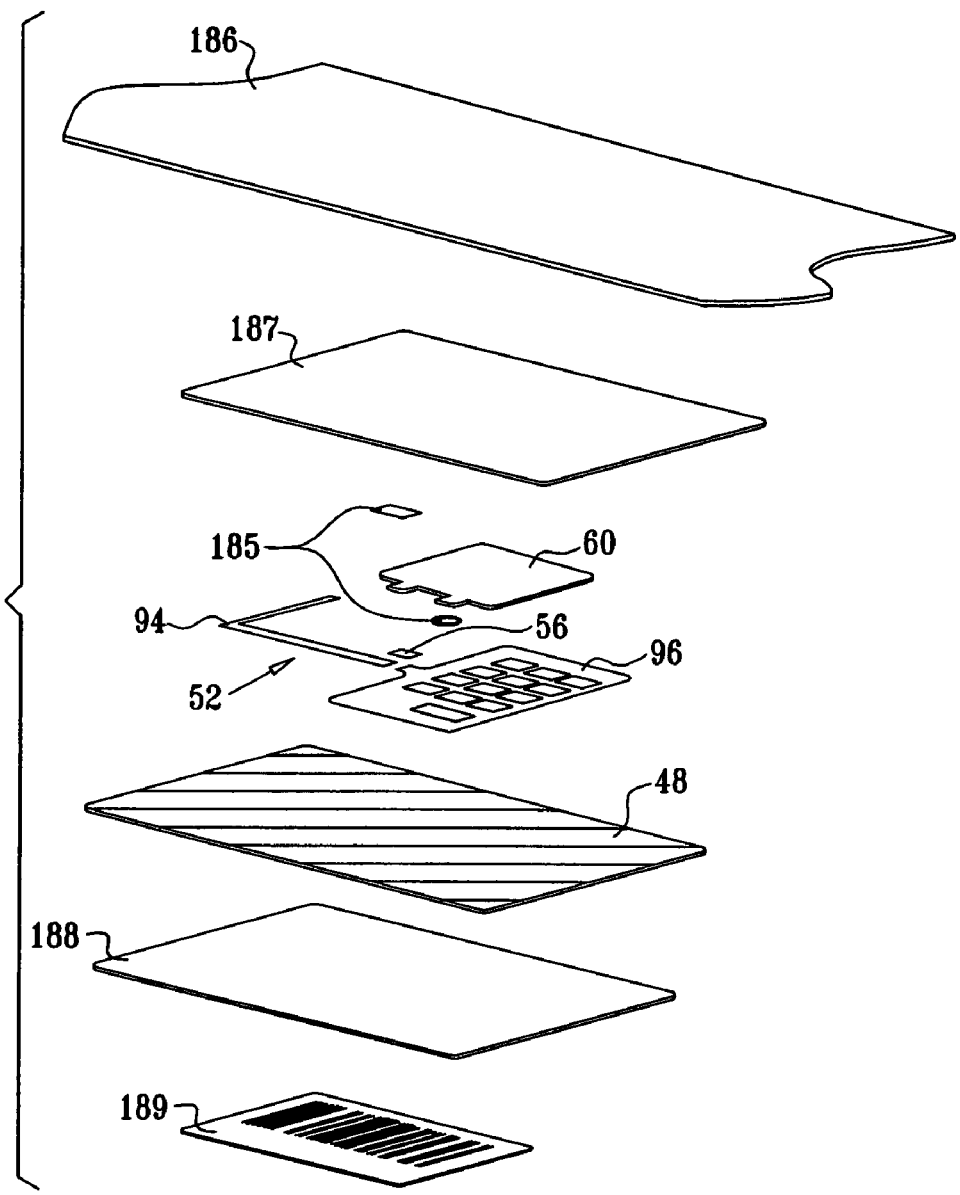
FIG. 8 is a schematic exploded view of an RFID transponder, in accordance with an embodiment of the present invention.

Transponder 28 can take the form of a tag or a label that is attached to the tracked object. Alternatively, in some cases the transponder may be incorporated as part of the tracked object itself. In other cases the transponder can be embedded inside a smart-card. Further alternatively, the transponder can be formed and packaged in any other suitable configuration, as required by its functionality in system 20. An exemplary mechanical configuration, in which transponder 28 is formed as a flexible label, is shown in FIG. 8 below. Transponder 28 can be produced at low cost and thus may be disposable.

In some embodiments, transponder 28 is configured to operate at a temperature range of from about −20° C. to about 65° C. and a non-condensing humidity range of from about 5% to about 95%. In some embodiments, transponder 28 is resistant to liquids and other non-corrosive materials. In some embodiments, transponder 28 facilitates improved communication compared to passive transponders in the presence of RF absorptive and reflective materials.

The code stored in transponder 28 may conform to any suitable structure, standard or convention. For example, the code may comply with the Electronic Product Code™, an industry-driven standard developed by EPCglobal, Inc. Further details regarding this standard can be found at www.epcglobalinc.org. An exemplary product identification convention is the EAN.UCC standard. Details regarding this standard are available at www.ean-ucc.org. In some embodiments, reader 32 may write input data into transponder 28 in addition to reading the code, as part of the interrogation process. The written data can later be read by the same reader or by a different reader in subsequent interrogations.

In some embodiments, the interrogation radiation and the backscattered radiation are transmitted in the ultra-high frequency (UHF) range, typically between about 300 and about 3000 MHz, although other suitable higher or lower frequency ranges, such as for example microwaves can also be used. Nothing herein is meant to limit the invention disclosed herein to operation within the UHF band. The particular choice of frequencies may depend upon national spectrum allocation and other regulatory and functional constraints. For example, typical frequency ranges are in the range of about 800-900 MHz in Europe and in the range of about 900-950 MHz in North America. In some embodiments, the same transponder can be configured to be operable in different frequency bands depending on geography. As such, the present invention readily facilitates seamless operation across the globe.

When reader 32 transmits information or other commands to the transponder, the transmission can use any suitable modulation type, such as amplitude shift keying (ASK), frequency shift keying (FSK), single sideband (SSB), double sideband (DSB) and phase shift keying (PSK) modulation.

Figure 2:
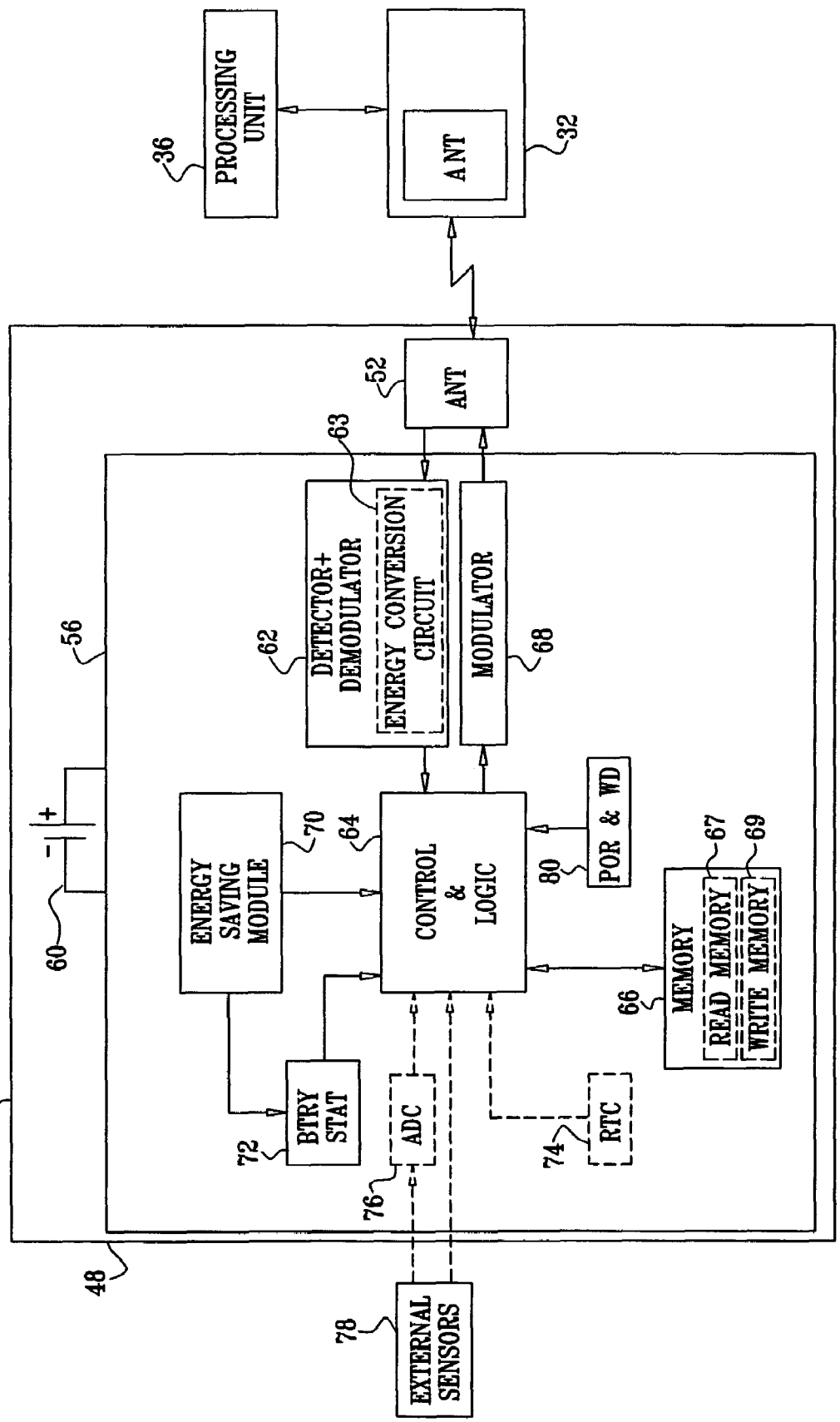
FIG. 2 is a block diagram that schematically illustrates an RFID system, in accordance with an embodiment of the present invention.

FIG. 2 is a block diagram that schematically illustrates details of RFID system 20, in accordance with an embodiment of the present invention. Transponder 28 comprises a substrate 48, which serves as the base for mounting the various transponder components. An antenna 52 receives and backscatters the interrogation radiation transmitted by reader 32. In some embodiments, the transponder may comprise two or more antennas for improved coverage.

An integrated circuit (IC) 56, typically an application-specific IC (ASIC), performs the various processing and logic functions of transponder 28. In some embodiments, some functions of IC 56 are implemented using discrete components that are disposed on substrate 48 as part of the transponder production process.

IC 56 is powered by a battery 60. The RF energy of the interrogation radiation is typically detected, amplified, filtered and demodulated by a detector/demodulator 62 in IC 56. Detector/demodulator 62 detects the presence of the interrogation radiation and demodulates the interrogation data, if such data is transmitted by reader 32. Detector/demodulator 62 may use constant false alarm rate (CFAR) techniques known in the art, or any other suitable method, for detecting the presence of the interrogation radiation in the presence of clutter, background noise and/or interference. In some embodiments, the detector and demodulator may be integrally formed in one circuit. Alternatively, the detector and demodulator may use separate components or may share some components.

A control module 64 typically receives an indication regarding the presence of the interrogation radiation, and optionally the demodulated interrogation data, from detector/demodulator 62. Control module 64 retrieves the transponder code, as defined above, which has been previously stored in a memory 66, and sends the code to a modulator 68, which accordingly modulates the RF radiation that is backscattered from antenna 52 to reader 32.

Battery 60 may comprise one or more suitable energy sources. The battery may optionally include circuitry configured to increase or otherwise control the supplied voltage. In some embodiments, battery 60 comprises at least one thin and flexible battery, such as the batteries produced by Power Paper Ltd. (Petah-Tikva, Israel). Such thin and flexible batteries are described, for example, in U.S. Pat. Nos. 5,652,043, 5,897,522 and 5,811,204, whose disclosures are incorporated herein by reference. Additional details can also be found at www.powerpaper.com. Thin batteries of this sort are typically less than 1 mm thick.

In some embodiments, the transponder is typically less than 1 mm thick and has a bending radius of less than 25 mm. In some embodiments, the transponder is less than 0.6 mm thick. In some embodiments, the transponder had a bending radius of less than 50 mm.

In some embodiments, the thin and flexible battery comprises a first insoluble negative electrode, a second insoluble positive electrode, and an aqueous electrolyte being disposed between the negative electrode and positive electrode. The electrolyte layer typically comprises (a) a deliquescent material for keeping the open cell wet at all times; (b) an electroactive soluble material for obtaining required ionic conductivity; and (c) a water-soluble polymer for obtaining a required viscosity for adhering the electrolyte to the electrodes. In some embodiments, the two electrode layers and the electrolyte layer are typically arranged in a co-facial configuration. Alternatively, the two electrode layers and the electrolyte layer can also be arranged in a co-planar configuration. The resulting battery can facilitate an even thinner transponder.

In other embodiments, battery 60 comprises a thin and flexible battery as described in U.S. Patent Application Publication 20030165744 A1, whose disclosure is incorporated herein by reference.

In some embodiments, as described in detail hereinbelow, when battery 60 is a thin and flexible battery as described above, the different layers of the battery are deposited on substrate 48 as part of the transponder production process. In alternative embodiments, a previously assembled thin and flexible battery is applied or attached to substrate 48.

In some embodiments, battery 60 may be kept in an inactivated state in order to increase the longevity of the battery. Such a case may be desirable for a transponder 28, which has been manufactured, but is not yet in use. Any suitable method of facilitating an inactivated state may be used, such as but not limited to use of a tab over the battery.

In some embodiments, control module 64 comprises a microcontroller core that runs suitable software, coupled with peripheral logic and memory. Alternatively or additionally, control module 64 may comprise logical functions and management functions implemented in hardware as part of IC 56.

Memory 66 may comprise any suitable non-volatile or battery-backed memory, such as an electronically erasable programmable read only memory (E²PROM). Battery-backed memory is sometimes advantageous due to its low working voltage and current and low cost.

In some embodiments, memory 66 comprises a read memory-section 67, in which module 64 stores the code and reads it during its transmission to the reader, and a write memory section 69, which is used for storing data sent to the transponder from the reader. In some embodiments, the read and write memory sections can be activated and deactivated independently as appropriate, in order to reduce the energy drawn from battery 60.

In some embodiments, the code is written permanently into memory 66 as part of the IC fabrication process or as part of the transponder production process. In other embodiments, the code can be written and modified by reader 32 during operation. In some embodiments, writing the code into the memory requires the use of a password or a suitable security code. The modulator modulates the retrieved code onto the backscattered radiation, which is backscattered from antenna 52 to reader 32. The modulation method is described in detail hereinbelow.

In some embodiments, transponder 28 comprises authentication and/or encryption means, for verifying the identity of the transponder and/or of the tracked object to the reader.

IC 56 may also comprise an energy saving module 70. Module 70 enables and disables different hardware functions and components of transponder 28, in accordance with the transponder's mode of operation, so as to minimize the current drawn from battery 60 and extend its lifetime. Module 70 can use a battery status indicator 72 for assessing the status of battery 60. Module 70 is typically implemented as a state-machine using hardware, software or a combination of both. The operation of module 70 is shown in detail in FIGS. 6A, 6B and 7 below.

In some embodiments, IC 56 comprises a real-time clock (RTC) 74. In some embodiments, the transponder reads the RTC and adds a time-stamp to the code sent to the reader. In some embodiments, transponder 28 senses one or more local conditions using one or more external sensors 78. For example, sensors 78 may sense the temperature or other environmental conditions in the vicinity of transponder 28. Sensors 78 may also comprise motion sensors, tamper sensors, shock/vibration sensors, humidity sensors, radiation sensors, chemical sensors, gas or fume sensors, weight sensors, drug (narcotics) sensors, explosives sensors or any other suitable sensor.

Some of sensors 78 may have digital or discrete outputs, whereas other sensors may have analog outputs. In some embodiments, IC 56 comprises an analog to digital converter (ADC) 76 that samples the outputs of the analog sensors and provides the sampled values to control module 64. In some cases, at least one sensor, such as a temperature sensor, can be implemented internally to the IC. In some embodiments, at least one sensor can be implemented externally to IC 56.

In some embodiments, the information of sensors 78 and RTC 74 is combined to provide time-dependent alarm conditions. For example, IC 56 may report an alarm to the reader if the local temperature exceeds a predetermined threshold for a predetermined time duration. The reported alarm can also contain a time-stamp indicating the time of the event. In some embodiments, the profile of the sensor measurements over time can be recorded in memory 66 while the tracked object is outside the reader communication range. A sensor profile such as a time-temperature profile is important in applications such as fresh food packages, medical supplies, drugs and any other temperature-sensitive commodity. In some embodiments, control module 64 can also activate, deactivate or otherwise control parts of the tracked object in accordance with commands received from the reader.

Transponder 28 can optionally comprise a display, such as, but not limited to a light-emitting diode (LED) or a liquid crystal display (LCD), not shown in the figures. The display may comprise an indicator element, such as, but not limited to a color changing element. In one non-limiting example, the indicator may readily facilitate a color change in the event of a product being out of date or if environmental conditions such as temperature have exceeded a specified limit.

In some embodiments, the IC comprises a power-on-reset (POR) and watchdog timer (WD) module 80. The POR typically resets control module 64 when power is applied. The watchdog timer typically resets a microcontroller in control module 64, when such a microcontroller is used, in certain software failure scenarios.

In some embodiments, the functions of IC 56 can also be performed by two or more application-specific or general-purpose components.

Figure 3A:
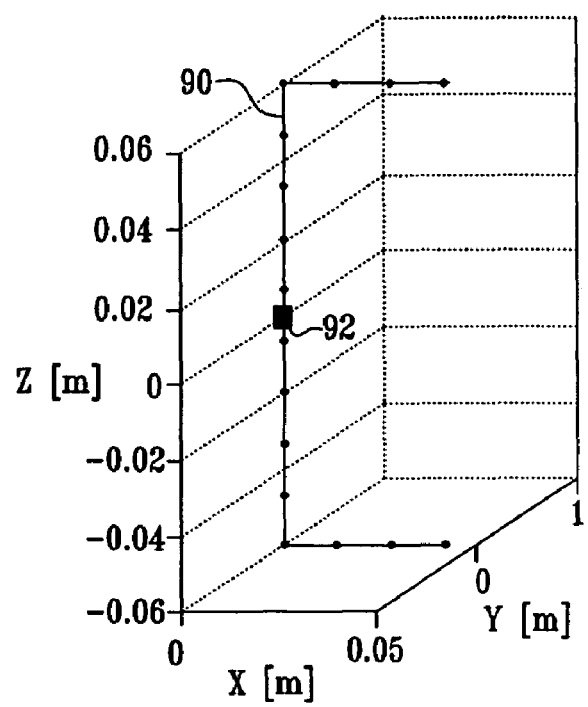
FIGS. 3A and 3B are geometrical diagrams that schematically illustrate RFID transponder antennas, in accordance with embodiments of the present invention.
Figure 3B:
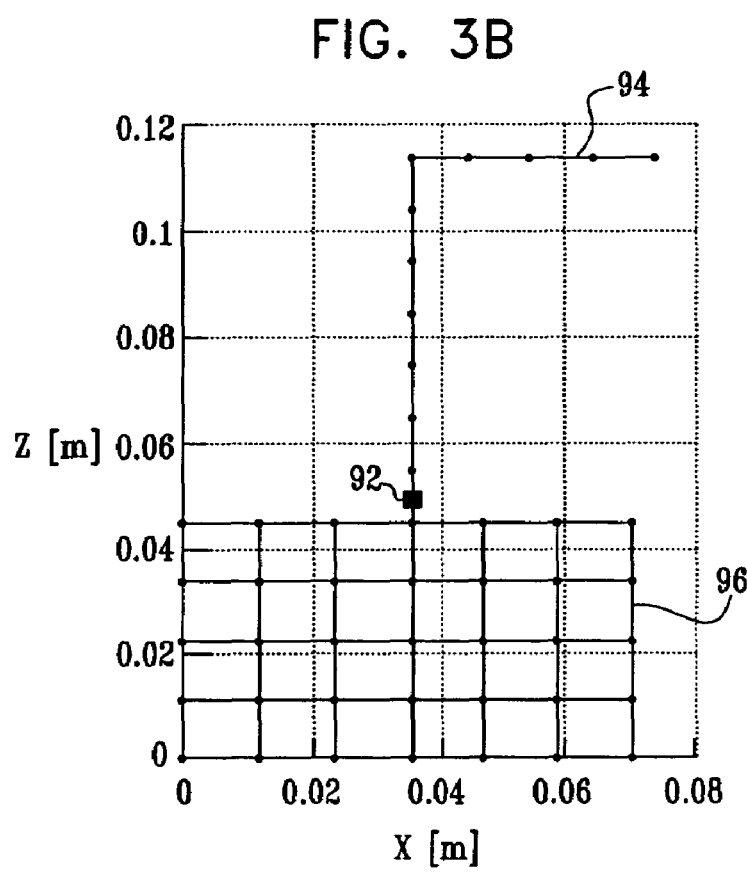
Figure 3C:
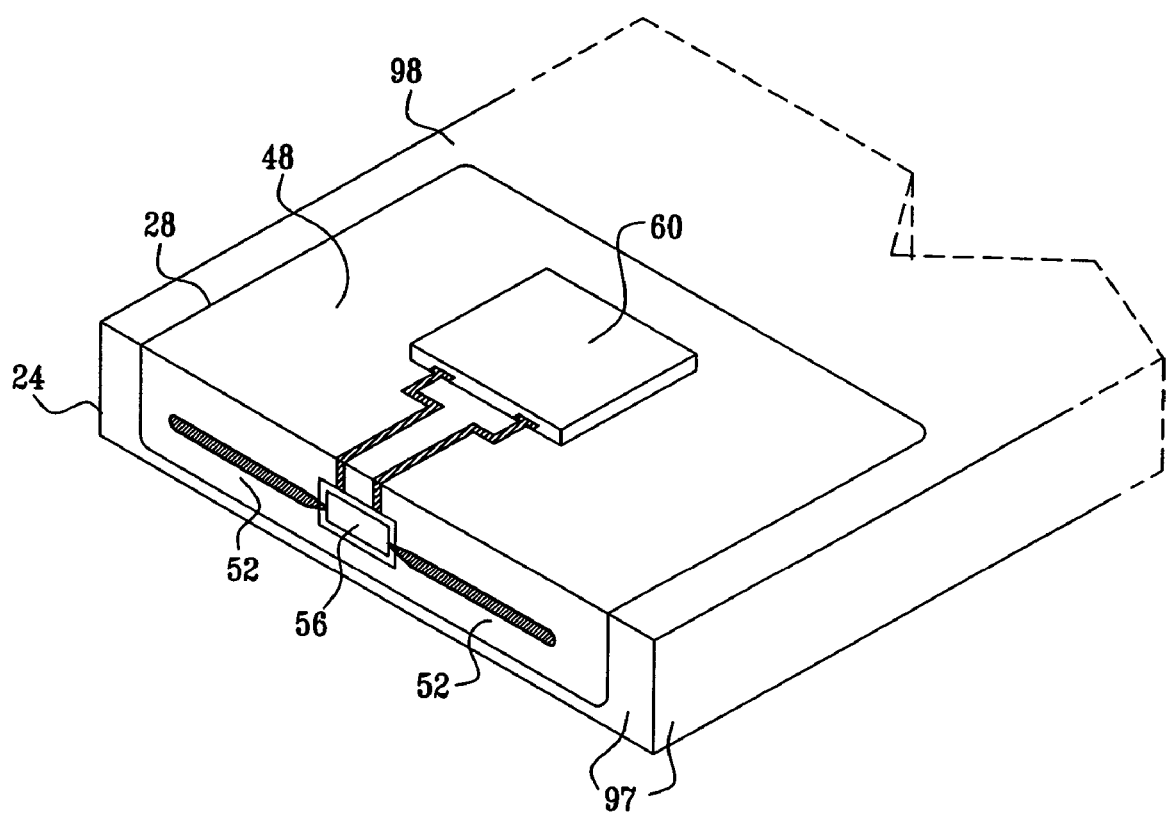
FIG. 3C is a schematic pictorial illustration of an RFID tag that is folded over an edge of an object, in accordance with an embodiment of the present invention.

FIGS. 3A-3C are diagrams that schematically illustrate different exemplary implementations of antenna 52, in accordance with embodiments of the present invention. Typically, the type of antenna chosen, as well as its configuration and dimensions, are dependent upon the operating frequency and upon the desired size and shape of the transponder. Antenna 52 may comprise a monopole, a dipole, a patch, an array, or any other suitable antenna type, as appropriate for the specific configuration of transponder 28. In some embodiments, parts of the antenna may be bent or otherwise oriented to fit within the allocated space on substrate 48.

FIG. 3A shows an exemplary dipole antenna 90 comprising two elements having bent tips that are fed at a feed-point 92. In this embodiment, which is optimized to give maximal backscatter and maximal modulation depth at a frequency of 900 MHz, each element is 102 mm long, of which 42 mm are bent at a 90° angle. In an alternative exemplary embodiment, also optimized to operate at 900 MHz, the total length of each element is still 102 mm, but the bent section is longer, such as 67 mm. In alternative embodiments, different total lengths and different lengths of bent tips can be used to suit the desired transponder size. A straight dipole with no bent tips can also be used if sufficient length is available on substrate 48.

FIG. 3B shows an exemplary monopole antenna comprising an active element 94 and a ground plane 96. Feed-point 92 is located at the bottom of the active element, between element 94 and ground plane 96. The total length of element 94 is again 102 mm, to maximize backscatter and modulation depth at the operating frequency of 900 MHz. As with dipole antenna 90, the tip of active element 94 of the monopole antenna is seen to be bent, to fit within the allocated geometry of transponder 28. Different amounts of bending, and in particular a straight monopole without bending, can also be used if sufficient length is available.

Antenna 52 may be deposited on substrate 48 using any suitable method, such as a thick-film deposition method, a printed circuit board (PCB) production method, an etching process, by printing an electrically-conductive ink, using a metallic foil, using a vaporization method, or using any other suitable method known in the art.

FIG. 3C shows an alternative configuration of transponder 28, in which the components of transponder 28 are located on two different surfaces of package 24. In some practical cases, it is desirable to locate antenna 52 on a narrow surface 97 of the package (or other object) that is too narrow to fit the entire transponder. For example, a surface 98, although wide enough for fitting the transponder, is sometimes made of a metallic material that interferes with the radiation pattern of antenna 52. Two such exemplary cases are compact disk (CD) packages and some medication packages. In another case, the tracked object may not include any surface wide enough to fit the entire transponder.

In these cases, transponder 28 can be mounted so as to wrap around a corner of package 24. The transponder is thus attached to two different surfaces of the package, as shown in the figure. As will be shown below, substrate 48 and the other layers of transponder 28, including antenna 52 and battery 60 are typically flexible enough to be wrapped around the corner in the manner shown or in any other suitable manner, which can facilitate an improved radiation pattern. In the example of FIG. 3C, antenna 52, in this case a straight dipole antenna, is located on narrow surface 97 together with IC 56. Battery 60 is located on surface 98 and interconnected to the IC. In other embodiments, the IC may be separate from the antenna and located on the same surface as the battery.

In some embodiments, part of the tracked object can be made from a suitable material, which can function as antenna 52 or part thereof. In one non-limiting example, part of a metallic crate, to which transponder 28 is attached, can be used as a radiating element or as a ground plane of the antenna.

When designing antenna 52 of transponder 28, it is typically desirable that the antenna radiation pattern be as close as possible to a spherical pattern. A spherical radiation pattern enables the reader to communicate with the transponder from any direction, within the specified communication range. In some embodiments, antenna 52 is orientation insensitive, such that it can operate in any position relative to the direction of the reader antenna. Nulls in the antenna radiation pattern typically cause "dead angles," in which the communication range between the reader and the transponder is significantly reduced. In some embodiments, antenna 52 is optimized to provide a maximum RCS and a maximum modulation depth (ΔRCS) during backscatter modulation, as described hereinbelow.

Figure 4A:
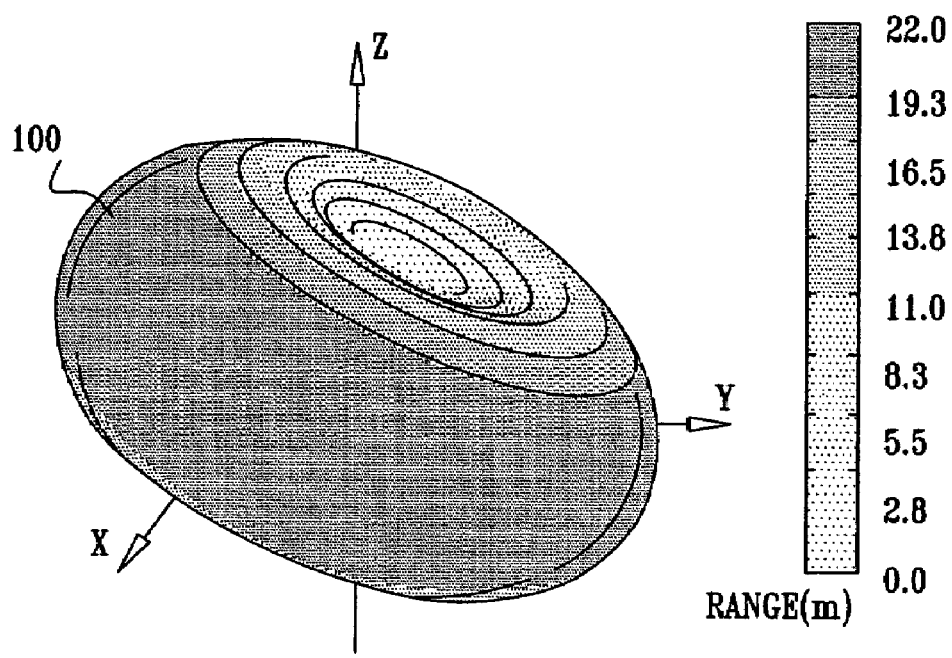
FIG. 4A is a diagram that schematically illustrates a radiation pattern of an RFID transponder antenna, in accordance with an embodiment of the present invention.

FIG. 4A is a diagram that schematically illustrates a 3-D radiation pattern 100 of antenna 52, in accordance with an embodiment of the present invention. The figure plots the radiation pattern of the monopole antenna illustrated in FIG. 3B above. For each angular direction in 3-D space, the plot shows the achievable reading range between reader 32 and transponder 28. In many practical implementations, a true spherical radiation pattern is difficult to achieve and often results in a significant loss of gain. In some embodiments, a doughnut-shaped pattern, such as pattern 100, is typically considered a good approximation.

Figure 4B:
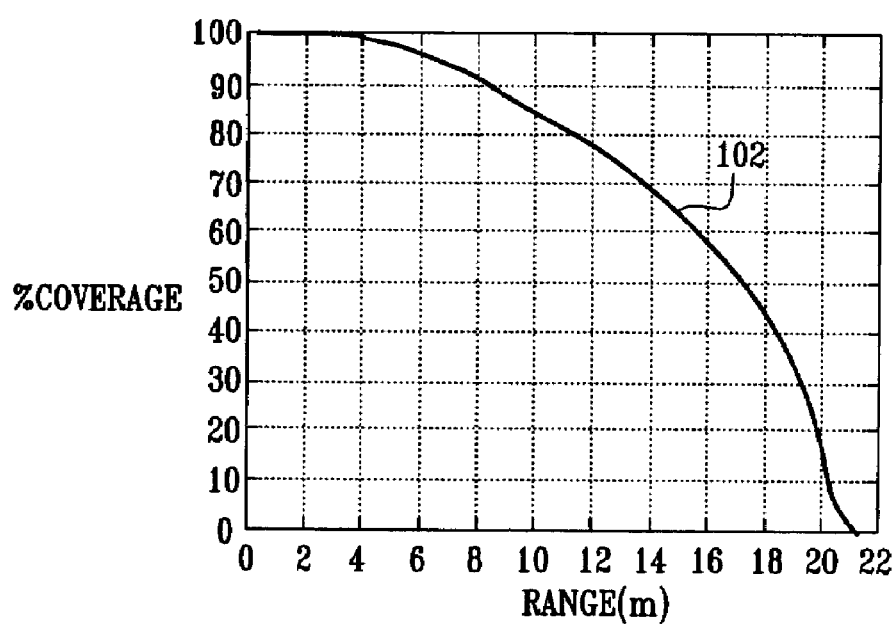
FIG. 4B is a graph that schematically illustrates coverage of an RFID transponder antenna, in accordance with an embodiment of the present invention.

FIG. 4B is a graph that schematically illustrates coverage of the monopole antenna, in accordance with an embodiment of the present invention. A plot 102 shows the percentage of 3-D angles that are covered by the radiation pattern of FIG. 4A, per each communication range. For example, at a communication range of 6.7 m, 95% of the 3-D angles are covered. In other words, when the distance between reader 32 and transponder 28 is 6.7 meters, communication will be available at 95% of the possible reader directions. At a distance of 19.3 meters, approximately 30% of the directions are covered.

Backscatter Modulation

Transponder 28 uses backscatter modulation for modulating the code onto the backscattered radiation transmitted to the reader. The ratio between the total RF power (of the interrogation radiation) irradiated onto antenna 52 and the total RF power that is backscattered from antenna 52 is referred to as the Radar Cross-Section (RCS) of antenna 52.

Modulator 68 of transponder 28 may receive from control module 64 a serial binary sequence, representing the information that is intended to be transmitted to the reader. The modulator modulates the RCS of antenna 52 responsively to this binary sequence. As a result, the amplitude of the backscattered radiation is modulated accordingly. Any suitable bit rate can be used when modulating the antenna RCS. For example, the EPCglobal specification cited above defines bit rates in the range of 40-640 kbps for the link from the transponder to the reader. Other applications use lower bit rates, in the range of about 1-3 kbps. Alternatively, any other suitable bit rate can be used.

As will be explained in detail below, control module 64 and modulator 68 are typically inactivated when interrogation radiation is not sensed by the transponder. In particular, backscatter modulation is performed only when the interrogation radiation is present. Reader 32 receives the backscatter-modulated radiation, demodulates and extracts the code, and forwards the information to processing unit 36.

Typically, modulator 68 switches the RCS between two values, referred to as "RCS high" and "RCS low," corresponding to the 1's and 0's of the binary sequence that represents the code. Typically, modulator 68 uses binary amplitude shift keying (ASK) to modulate the value of the antenna RCS. In alternative embodiments, the modulator can modulate the antenna RCS with more than two values, such as using quaternary-ASK modulation.

When transponder 28 performs backscatter modulation, only the energy of the interrogation radiation is used for generating the backscattered radiation. In particular, transponder 28 uses the electrical power of battery 60 merely for modulating the antenna RCS, and not for generating the energy required for backscattering, thus extending the lifetime of the battery and of the transponder.

Typically, modulator 68 varies the RCS of antenna 52 by varying the impedance at feed-point 92. A first impedance value is set, so that the amount of power that is backscattered from the antenna is minimized, thus providing the "RCS low" state. A second impedance value is set, so as to maximize the power that is backscattered by the antenna, thereby producing the "RCS high" state. In one embodiment, the modulator provides the "RCS high" state by producing an open circuit at the antenna terminals. The open circuit condition causes substantially all of the power of the interrogation radiation received by the antenna to be backscattered. Therefore, the communication range between the transponder and the reader is maximized.

Controlling the impedance at the feed-point of antenna 52 enables the modulator to control the absolute RCS values of the antenna, as well as the ratio between "RCS high" and "RCS low" values. This ratio is denoted ΔRCS, sometimes also referred to as the modulation depth.

In some embodiments, the antenna and the modulator are jointly designed so as to comply with two conditions simultaneously. Maximizing the amount of backscattered power (also referred to as a "backscatter gain" or "backscatter value") in the "RCS high" state causes a maximization of the transponder communication range. At the same time, maximization of the modulation depth (ΔRCS) enables the reader to differentiate between transmitted 1's and 0's, so as to reliably demodulate the code from the backscattered radiation. Typically, the antenna can be optimized for maximum RCS and ΔRCS only within the geometrical constraints and available size in transponder 28.

In some passive and battery-assisted transponders described in the background art that use interrogation radiation power for operating the transponder, the circuitry that interfaces to the antenna also comprises means for rectifying or otherwise drawing energy from the interrogation radiation. In other words, the antenna is loaded by the transponder power supply or energy conversion circuitry. Such energy conversion circuitry typically introduces additional parallel resistance and capacitance across the antenna, which significantly reduce the antenna's backscattering performance. Transponder 28, on the other hand, does not draw power from antenna 52 for powering the IC. Therefore, antenna 52 and its matching can be optimized for maximum backscattering efficiency and modulation depth without such additional constraints.

In some embodiments, the backscattering efficiency of transponder 28 is typically higher than 75%, and in many cases higher than 95%. The backscattering efficiency is defined as the ratio between the total power that is backscattered from the antenna and the total power of the interrogation radiation that is received by the antenna. In other words, a backscattering efficiency of 95% means that 5% of the power of the interrogation radiation received by the antenna is unavailable for backscattering, and 95% of the received power is backscattered.

In some embodiments, the modulator comprises a solid-state switch, which is operatively coupled to the antenna terminals, typically at or near feed point 92. The switch changes the value of the impedance that loads antenna 52 at the antenna feed-point, thus modulating the RCS of the antenna, as explained above.

Switch 82 may comprise a field-effect transistor (FET), a Gallium-Arsenide switch, a PIN-diode switch, or a switch produced using any other suitable switching technology. The switching time of the switch is typically below 50 ns. In some cases, a high RCS can be produced by making the input impedance of the IC a low real load (i.e., a low resistance). A low RCS can typically be obtained by loading the antenna with a real (resistive) load that is matched to the impedance of the antenna. It should be noted, however, that the physical size of the antenna has a major effect on the achievable RCS values. Exemplary impedance values for switch 82 are as follows:

|  | RCS high | RCS low |
| --- | --- | --- |
| Resistance | ≦10 Ω | ≧1000 Ω |
| Parallel capacitance | ≦1 pF | ≦0.25 pF |

Assuming a half-wavelength antenna, such impedance values cause "RCS high" and "RCS low" values of approximately −1 dB and approximately −20 dB, respectively. Alternatively, any other suitable impedance values can be used.

Considering the radiation pattern of antenna 52, the "RCS high" and "RCS low" backscatter modulation states cause antenna 52 to have two different backscatter values in any angular direction. The communication range between transponder 28 and reader 32 typically varies with the azimuth and elevation angle of the reader relative to the transponder antenna.

Figure 5A:
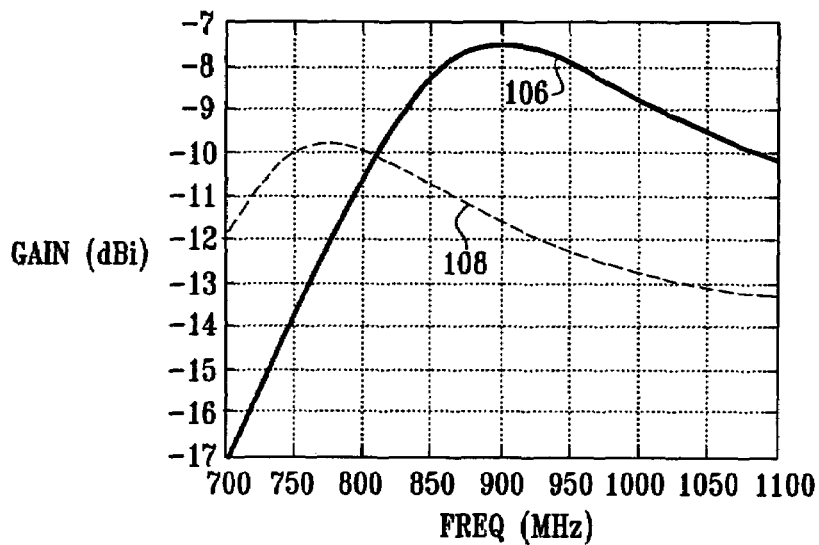
FIGS. 5A-5C are graphs that schematically illustrate backscatter values of RFID transponder antennas, in accordance with embodiments of the present invention.
Figure 5B:
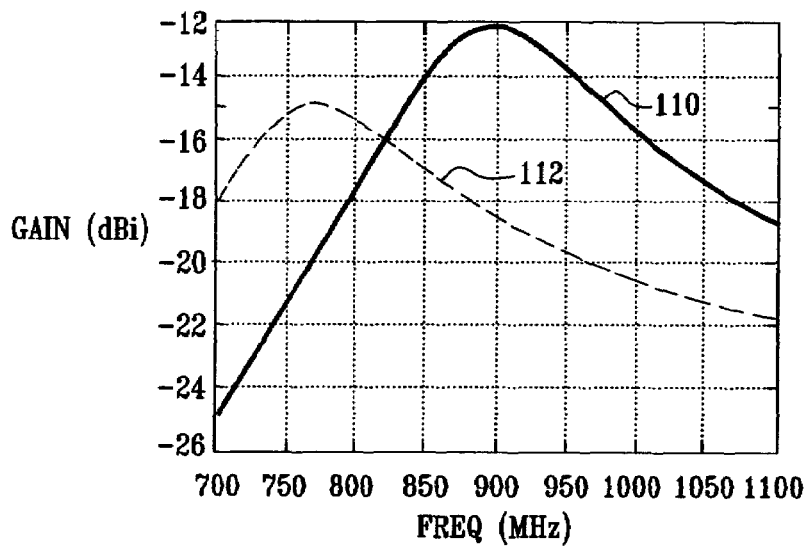
Figure 5C:
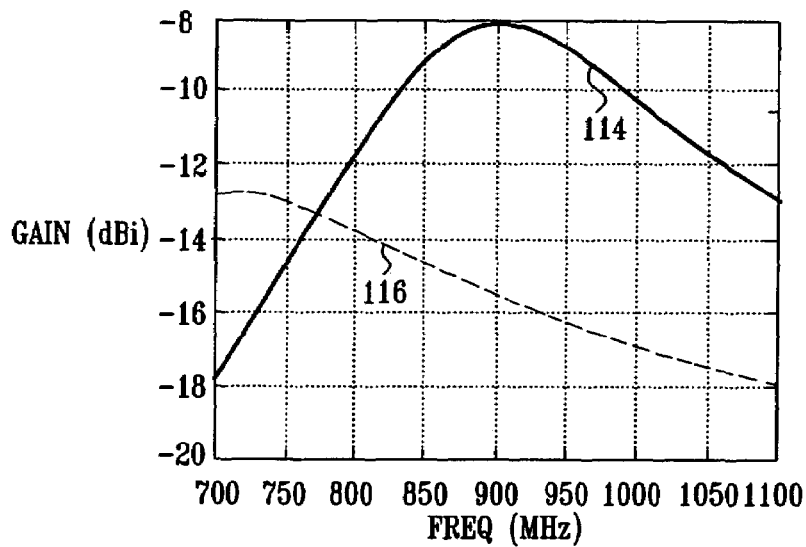

FIGS. 5A-5C are graphs that schematically illustrate "RCS high" and "RCS low" backscatter values of RFID transponder antennas as a function of frequency, in accordance with embodiments of the present invention. FIG. 5A shows the backscatter values of bent dipole antenna 90 shown in FIG. 3A above (with 42 mm bent tips). A plot 106 shows the backscatter value of dipole 90 in the "RCS high" state, plotted as a function of frequency. The backscatter value is expressed in dBi, or dB compared to an ideal isotropic radiator. A plot 108 shows the backscatter value of the same dipole antenna, when switched to the "RCS low" state by the modulator. In examining plot 106 it can be seen that the antenna and its matching are designed so that the backscatter gain in the "RCS high" state is maximized at the operating frequency of 900 MHz, being approximately −7.5 dB. In plots 106 and 108 it can be seen that ΔRCS (the difference between the values of plot 106 and plot 108 at a particular frequency) is also maximized at 900 MHz, being approximately 4 dB.

FIG. 5B shows the backscatter value of bent dipole antenna 90 with 67 mm bent tips. A plot 110 shows the backscatter value of the antenna in the "RCS high" state, and a plot 112 shows the backscatter value in the "RCS low" state. Again, the gains are plotted as a function of frequency and expressed in dBi. As in FIG. 5A, it can be seen that the backscatter value in the "RCS high" state is maximized at 900 MHz, being approximately −12 dB. The value of ΔRCS is also maximized at 900 MHz, being approximately 6 dB.

FIG. 5C shows the backscatter value of the monopole antenna shown in FIG. 3B above. A plot 114 shows the backscatter value of the monopole antenna in the "RCS high" state, and a plot 116 shows the backscatter value in the "RCS low" state. Both εRCS and the backscatter value in the "RCS high" state are maximized at 900 MHz, being approximately −8 dBi and 7.5 dB, respectively.

Operational Modes and Energy Saving

Figure 6A:
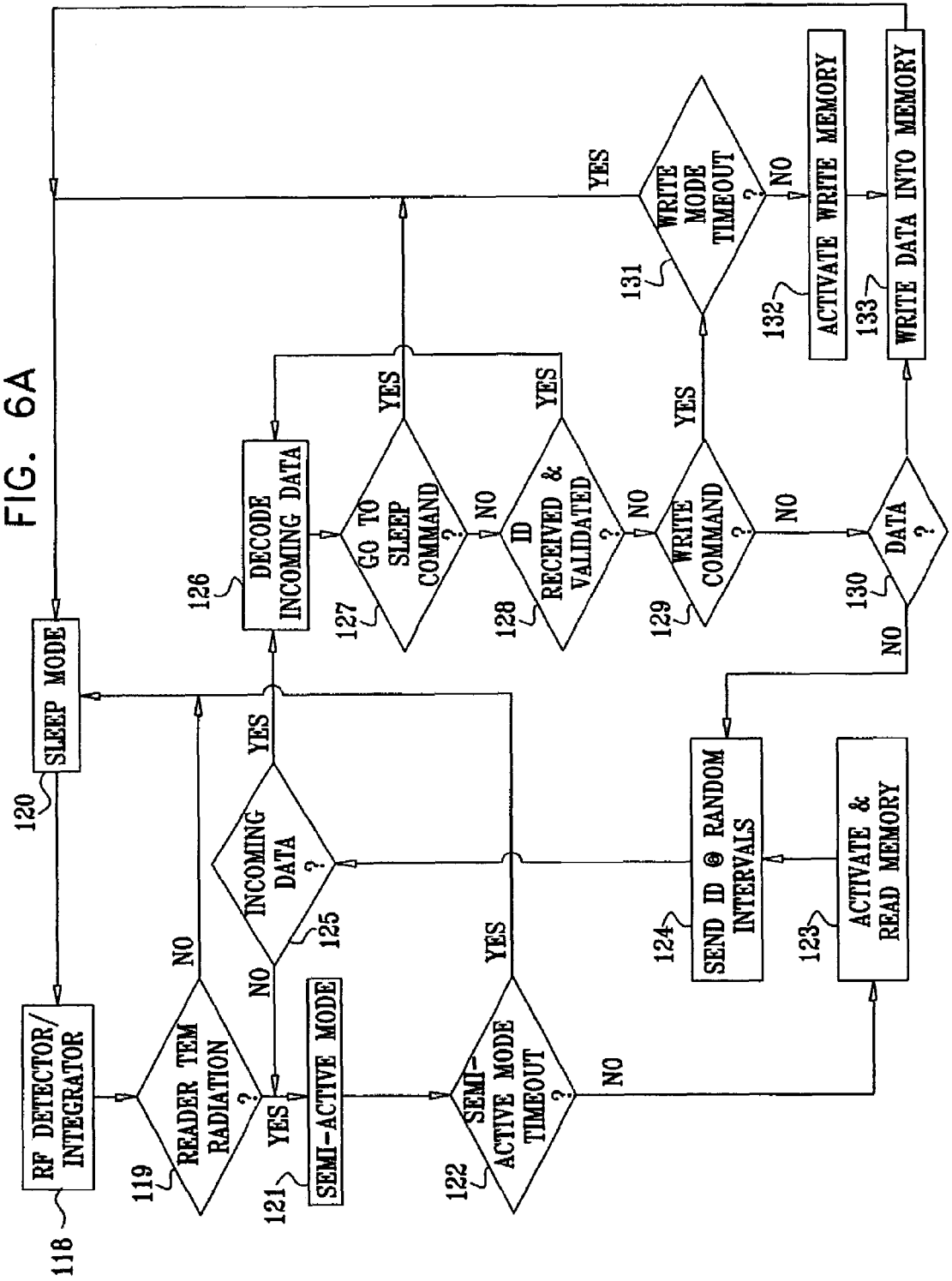
FIGS. 6A and 6B are flow charts that schematically illustrate methods for communicating between a reader and an RFID transponder, in accordance with embodiments of the present invention.
Figure 6B:
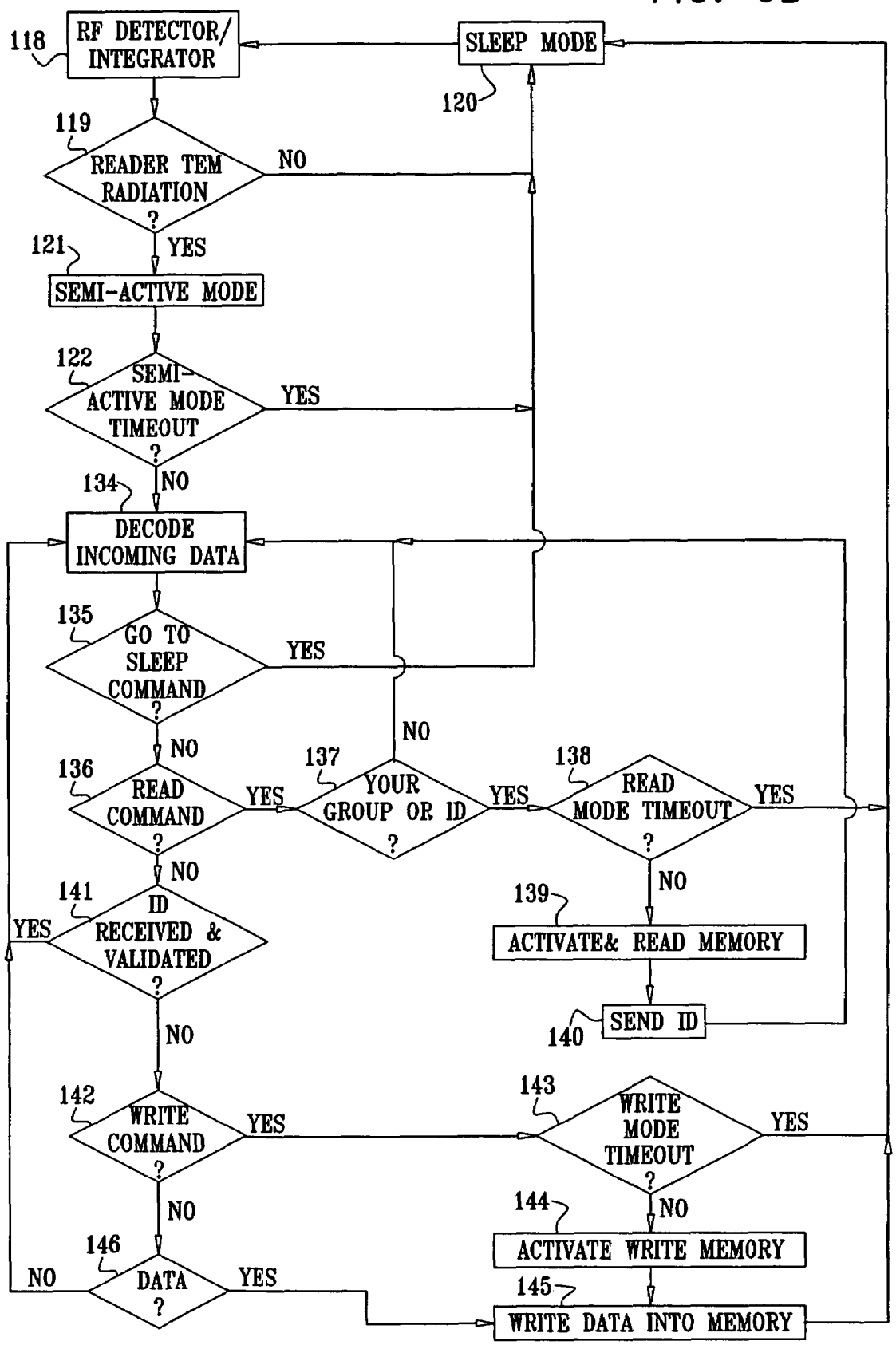

FIGS. 6A and 6B are flow charts that schematically illustrate methods for communicating between reader 32 and RFID transponder 28, in accordance with embodiments of the present invention. Transponder 28, as part of RFID system 20, can operate in various operating modes and sequences. The operating modes may be defined, for example, by the particular protocol or standard used by system 20, such as the EPCglobal standard cited above. The specific set of operating modes used by transponder 28, as well as the various triggers or conditions for transitions between modes, are typically defined in control module 64 and in energy saving module 70 in IC 56.

Although FIGS. 6A and 6B below describe two possible sets of operating modes, these are shown purely as clarifying examples. Many other mode definitions and sequences can be implemented in transponder 28 and in system 20 in general. Such definitions will be apparent to those skilled in the art and are considered to be within the scope of the present invention. In particular, FIGS. 6A and 6B serve to demonstrate the operation of energy saving module 70 in IC 56. For each operating mode defined for transponder 28, module 70 activates only the required hardware functions of transponder 28, so as to minimize the current drawn from battery 60.

Energy saving module 70 also comprises timeout timers that determine maximum time durations that the transponder is allowed to stay in for each operational mode. These timers typically expire under abnormal operating conditions, such as when communication failures occur. Typically, when a timeout condition expires, the transponder returns to a "sleep mode," which consumes little current from battery 60. The use of timeout conditions thus further extends the lifetime of battery 60. The timeout mechanisms can be implemented in hardware, software or a combination of both. Since in some operational modes control module 64 is disabled, timeouts that are associated with such operational modes are typically implemented in hardware.

Generally speaking, transponder 28 and reader 32 can be operated in two different regimes or protocols, referred to as Transponder-Talks-First (TTF) and Reader-Talks-First (RTF). In TTF operation, when the transponder senses the presence of the interrogation radiation, it begins to transmit its code, typically at random intervals. In RTF operation (sometimes referred to as Interrogator-Talks-First, or ITF), the reader has to explicitly instruct the transponder to transmit its code, as part of the interrogation process.

FIG. 6A shows a method that is typical of TTF operation. The method begins with transponder 28 in a "sleep mode," at a standby step 120. The transponder continually checks for the presence of interrogation radiation, at a detection step 118 and a reader detection step 119. Until such presence is detected, the transponder remains in sleep mode. Typically, when in sleep mode, energy saving module 70 activates only minimal hardware functions and draws minimal current from battery 60. For details regarding the different energy saving states and the operation of module 70, see FIG. 7 below. In some embodiments, in which the transponder comprises RTC 74, RTC 74 can be energized at all times by the transponder battery, even when the transponder is in sleep mode.

In some embodiments, the RF detector in detector/demodulator 62 is configured to distinguish between noise and TEM radiation. By detection, distinction and level measurement of noise and signal, the RF detector can readily facilitate changing its detection sensitivity accordingly, such as changing a signal detection reference level in relation to the noise. As such, the RF detector ensures that the device will not be operated by the noise and avoids unnecessary drawing of energy from battery 60.

When interrogation radiation is detected at step 119, the transponder can enter a semi-active mode, at a semi active operation step 121. The transponder can check whether a semi-active timeout expires, at a semi-active expiry step 122. If the timeout expires, the transponder can return to sleep mode at step 120.

After entering the semi-active mode, the transponder can activate read memory section 67 in memory 66, at a read activation step 123. The read memory is activated to allow the transponder to read its code from memory 66. The transponder can read the code from memory 66 and can transmit it to the reader using backscatter modulation, at a code transmission step 124. Typically, the transponder repeats transmitting the code at random or pseudo random intervals, to avoid collision with transmissions from other transponders. Alternatively, any other suitable anti-collision protocol may be adopted by the transponder. Module 70 comprises a code transmission timeout counter that determines the maximum time interval or the maximum number of repetitions for transmitting the code. Once the code transmission timeout expires, the transponder can return to sleep mode at step 120.

After transmitting its code to the reader, the transponder can check for incoming interrogation data from the reader, at a data checking step 125. If such data exists, the transponder can receive the interrogation data, at an interrogation reception step 126. The interrogation data may comprise incoming data to be written to memory 66, or commands affecting the operation of the transponder.

The transponder can check whether the interrogation data comprises a "go to sleep" command, at a sleep checking step 127. If instructed to go to sleep, the transponder can return to step 120. The transponder can check whether the interrogation data comprises a message acknowledging the reception (ACK) of the code by the reader and completion of the transponder's function (also referred to as an "ID validated" message), at a code validation checking step 128. If such a command is received, the transponder can continue to decode the interrogation data at step 126.

Otherwise, the transponder can check whether the interrogation data comprises a "write" command, at a write checking step 129. If a write command is detected, and a write mode timeout is not expired, the transponder can activate write memory section 69 in memory 66, at a write activation step 132. The transponder can check for subsequent data transmitted from the reader, at a data checking step 130. If such data is received, the transponder can write the data into memory 66, at a writing step 133. Then, the transponder can return to sleep mode at step 120. The write mode timeout timer, checked at a write mode checking step 131, can limit the write mode duration in case of communication failure.

If no data is detected, the transponder can return to step 124 and can continue to transmit its code and check for data or commands, until the semi-active mode timeout at module 70 expires. Then, the transponder can return to sleep mode at step 120.

FIG. 6B shows an alternative method, which is typical of RTF operation. A basic difference between TTF and RTF operation is that in RTF, once the presence of a reader has been detected, the transponder begins to listen to the reader and check for data or commands.

The method begins with transponder 28 in "sleep mode," at standby step 120. Once a reader is detected at reader detection step 119, the transponder can enter the semi-active mode at semi-active operation step 121. If the semi-active mode timeout expires, as checked by semi-active expiry step 122, the transponder can return to sleep mode at step 120.

Otherwise, the transponder can begin to receive and decode the interrogation data transmitted by the reader, at a decoding step 134. If the received interrogation data comprises a "go to sleep" command, as checked by a sleep checking step 135, the transponder can return to sleep mode at step 120. Otherwise, the transponder can check whether the interrogation data comprises a "read" command, at a read checking step 136. If a "read" command is received, the transponder can check whether the read command is addressed to it, or to its group, at an address checking step 137. If the received "read" command is not addressed to the specific transponder 28 or its group, it can return to decoding step 134 and can continue to decode the interrogation data.

If the "read" command is appropriately addressed to the specific transponder or to its group, the transponder can verify that a read mode timeout in module 70 is not expired, at a read mode expiry checking step 138. If expired, the transponder can return to sleep mode at step 120. Otherwise, the transponder can activate read memory section 67 of memory 66 and can read the code from it, at a reading step 139. The transponder can then transmit the code using backscatter modulation to the reader, at a code transmission step 140. Following sending the code, the transponder can return to step 134 and can continue to decode the incoming interrogation data.

The transponder can check whether the interrogation data comprises an acknowledgement (an "ID received and validated") message, at a validation checking step 141. If such a command is received, the transponder can continue to decode the interrogation data at step 134.

The transponder can then check whether the interrogation data comprises a "write" command, at a write checking step 142. If a write command is detected, and a write mode timeout is not expired, the transponder can activate write memory section 69 in memory 66, at a write activation step 144. The transponder can check for subsequent data transmitted from the reader, at a data checking step 146. If such data is received, the transponder can write the data into memory 66, at a writing step 145. Then, the transponder can return to sleep mode at step 120. The write mode timeout timer, checked at a write mode checking step 143, can limit the write mode duration in case of communication failure.

If no data is detected, the transponder can return to step 134 and continue to check for and decode the interrogation data, until the semi-active mode timeout at module 70 expires. Then, the transponder can return to sleep mode at step 120.

In some embodiments, IC 56 has a fallback mode of operation, in which the transponder can operate similarly to a passive transponder when battery 60 is unable to supply sufficient power for powering the IC. In these embodiments, the IC can comprise an energy conversion circuit 63 comprising a rectifier, a capacitor or similar energy conversion and/or storage circuitry for drawing energy from the interrogation radiation. IC 56 typically comprises one or more switches for switching energy conversion circuit 63 on and off as needed. (As noted above, the energy conversion circuit typically reduces the backscatter efficiency of antenna 52. Therefore, it is often desirable to switch the circuit off under normal battery-assisted operation and use it only when the battery is not used.)

Energy saving module 70 can check the status of battery 60 using battery status indicator 72 and can forward this data to control module 64. If indicator 72 senses that the battery has insufficient power, for example by sensing that the battery voltage drops below a predetermined threshold, module 70 can switch on the energy conversion circuit. This feature enables transponder 28 to continue operating as a passive backscatter transponder, although typically with a reduced communication range, long after battery 60 is exhausted.

FIGS. 6A and 6B show exemplary operational sequences typical of TTF and RTF operation, respectively. In some alternative embodiments, the transponder can use a unified operational sequence, suitable for both TTF and RTF operation. In such embodiments, after detecting the presence of a reader, the transponder typically checks whether the desired mode or operation, as indicated by the reader, is RTF or TTF, and performs the appropriate operational sequence.

In some embodiments, battery status indicator 130 can include a built in test (BIT) or alternatively BIT can be a separate component. The battery status includes, but it not limited to built-in test parameters and battery low warning. Built-in test parameters can include, but are not limited to, "battery good" indication, "battery low" indication, "battery needs to be replaced" indication, estimated and calculated number of possible operations with battery, and combinations thereof. In some embodiments, transmission of the battery status is performed with every transmission of transponder 28, as part of the code. Alternatively, the battery status is transmitted upon request by reader 32.

In some scenarios, the interrogation radiation has excess power, above the power that is required for reliably communicating with the reader. Such a condition may occur, for example, when the distance between the reader and the transponder is small. In some embodiments, when the interrogation radiation has excess power, energy conversion circuit 63 can draw some or all of the excess power from the interrogation radiation. The transponder may, for example, use the excess power for powering IC 56 in parallel with battery 60. Additionally or alternatively, the transponder can charge battery 60 using the excess power. Further additionally or alternatively, the transponder can make any other suitable use of the excess power of the interrogation radiation.

It should be stressed, however, that when using the power of the interrogation radiation, first priority is typically given to maximization of the communication range between the reader and the transponder at a specified communication reliability. Exploiting the excess power is thus restricted to cases, in which the transponder communication range and communication reliability are not compromised.

Energy Saving in RTF Operation

When transponder 28 operates in RTF mode, as required, for example, by the EPCglobal standards cited above, there is a particular need for efficient energy saving. The RTF protocol requires the transponder to continuously listen and check for data and commands whenever interrogation radiation is sensed. Since typical RFID systems contain multiple transponders and sometimes multiple readers, a particular transponder may sense interrogation radiation for a significant percentage of the time. The majority of these interrogations are typically intended for other transponders. If the transponder were to fully activate its circuitry whenever interrogation radiation is present, its battery life would be significantly reduced.

Energy saving module 70 in transponder 28 is particularly suitable for operating in RTF mode and enables a significant extension of the lifetime of battery 60. In principle, once interrogation radiation is sensed by the transponder, the transponder analyzes the radiation in order to determine whether or not the radiation is relevant to it. Module 70 progressively activates components of the transponder, so that only the minimal current is drawn from battery 60 during the analysis process. Once the radiation is determined to be relevant (e.g., a valid interrogation radiation and not noise or interference, or a radiation addressed to this specific transponder), module 70 can enable the transponder to transmit the backscattered radiation or otherwise react to the interrogation radiation.

In some embodiments, several power saving states are defined in module 70. Each operational mode of the transponder, such as the different modes described in FIGS. 6A and 6B above, is associated with a particular energy saving state. Using the different energy saving states, module 70 activates and deactivates the minimal number of hardware functions, as required by each operational mode. In an exemplary embodiment, five different power management states are defined in module 70, in accordance with the following table:

| Energy saving state | Transponder Functionality | Active hardware | Typical current |
| --- | --- | --- | --- |
| A | Check for presence of interrogation radiation power | RF detector in detector/demodulator 62 | <0.25 μA |
| B | Search for preamble in interrogation radiation | Detector/demodulator 62, preamble identifier in module 64 | <3 μA |
| C | Decode interrogation data and commands | Same as in B above, plus a command identifier in module 64 | <5 μA |
| D | Read mode (operate full logic and read code from memory) | Same as C above, plus module 64 and read memory in memory 66 | <10 μA |

-continued

| Energy saving state | Transponder Functionality | Active hardware | Typical current |
|---|---|---|---|
| E | Write mode (operate full logic and write data to memory) | Same as D above, plus write memory in memory 66 | <15 µA |

Figure 7:
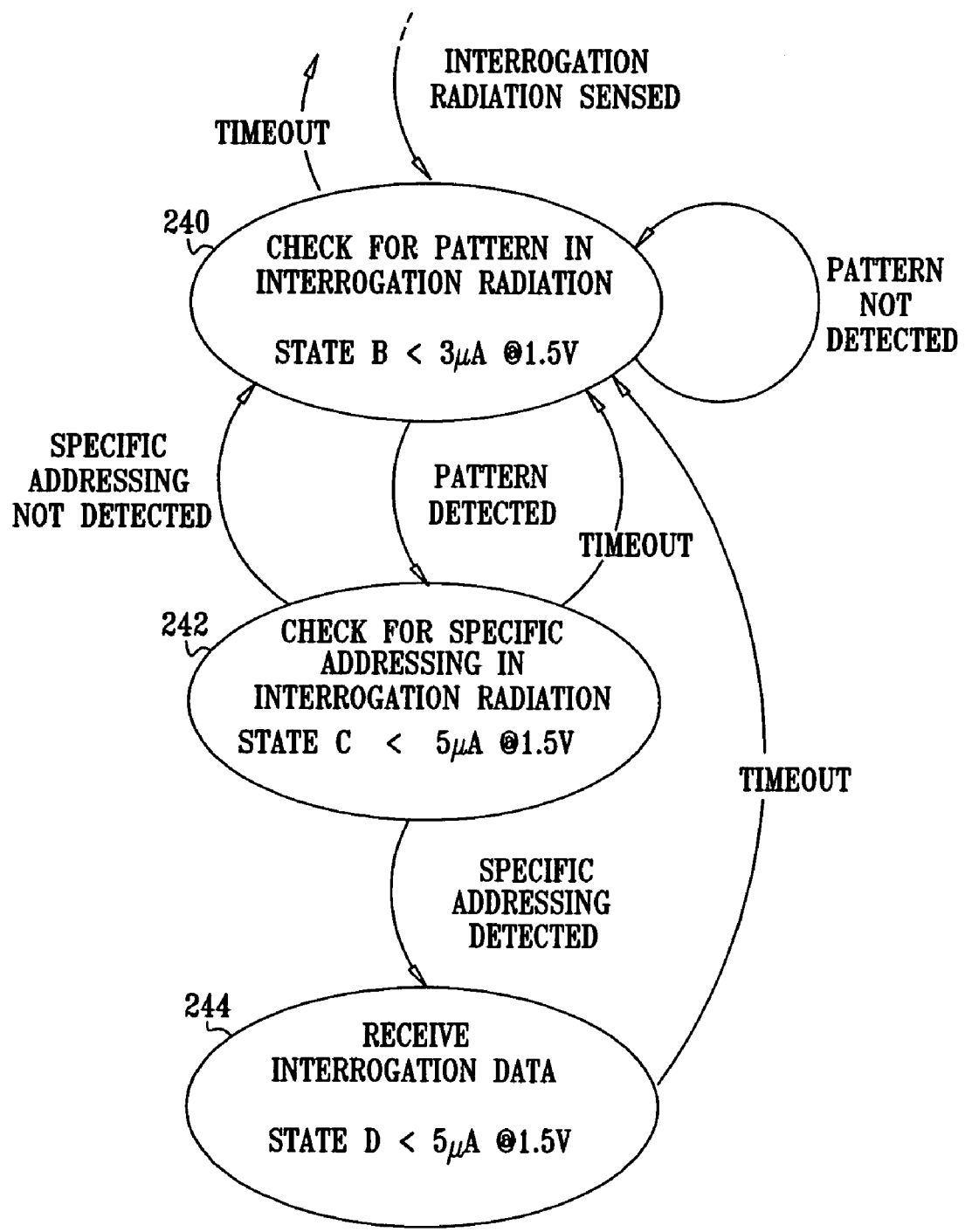
FIG. 7 is a state diagram that schematically illustrates energy saving operation in reader-talks-first mode, in accordance with an embodiment of the present invention.

FIG. 7 is a state diagram that schematically illustrates an exemplary mechanism for energy saving, carried out by module 70 in RTF mode, in accordance with an embodiment of the present invention.

The mechanism of FIG. 7 is invoked when transponder 28 senses the presence of interrogation radiation. This mechanism can be invoked, for example, after reader detection step 119 in the method of FIG. 6B above and can replace steps 119-134 of this method.

Following detection of the interrogation radiation, transponder 28 can check for the existence of a predetermined data pattern in the interrogation radiation, in a pattern checking state 240. The purpose of step 240 is to avoid activating unnecessary hardware components until it is verified that the sensed energy originates from a valid interrogation radiation of a reader and not from noise or interference. In state 240, module 70 is in energy saving state B (as defined in the table above) and the current drawn from battery 60 is typically below 3 µA at 1.5 volts. State 240 thus enables screening many false alarm events while drawing minimal current from the battery.

Once a valid pattern is detected, transponder 28 can demodulate the preamble of the interrogation radiation and can check for specific addressing, in an address verification state 242. The purpose of state 242 is to screen out interrogations that are not addressed to this specific transponder, and thus should be ignored. In state 242, module 70 is in energy saving state C and the current drawn from battery 60 is typically below 5 µA at 1.5 volts. If specific addressing is not detected within a predetermined timeout interval, the transponder can return to state 240.

Once the interrogation is found to be addressed to the specific transponder, module 70 can activate the hardware necessary for demodulating the full interrogation data, and can receive the data in an interrogation demodulation state 244. In state 244, module 70 is in energy saving state D and the current drawn from battery 60 is typically below 10 µA at 1.5 volts.

As can be appreciated from the mechanism described above, state 244 is reached only when it is assured that a valid interrogation radiation that is intended for the specific transponder is being received. Therefore, the use of this state machine mechanism reduces significantly the average current drawn from battery 60 in RTF operation.

In some embodiments, transponder 28 can also change its operational mode in response to predetermined timeout conditions. Such conditions are evaluated and activated by energy saving module 70. For example:

If interrogation radiation is detected for a predetermined duration of time, but within this time duration no pattern is detected, the transponder can regard the detected energy as noise or interference. Following such an event, module 70 may force the transponder to ignore subsequent interrogation detections for a predetermined time interval.

If a pattern is detected but no addressing to the specific transponder is detected within a predetermined duration of time, module 70 may force the transponder to ignore subsequent interrogation detections for a predetermined time interval.

Following a successful interrogation and data exchange between the transponder and the reader, the transponder may conclude that the reader is not likely to interrogate it again for a certain period of time. In such case, module 70 forces the transponder to ignore subsequent interrogation detections for a predetermined time interval following a successful interrogation. (This condition demonstrates that in some cases, timeout conditions can use knowledge of the specific RTF protocol used, in order to save battery energy.)

By using timeout conditions, the transponder is able to spend a higher percentage of the time in states that consume less power, thus reducing the average power consumption from battery 60. Combining the timeout conditions with the state machine mechanism shown in FIG. 7 above, the average current consumption from battery 60 is significantly reduced. The lower energy consumption can be used to extend the lifetime of the transponder, or to reduce the size of battery 60 and further miniaturize the transponder.

RFID Transponder Mechanical Structure

FIG. 8 is a schematic exploded view of RFID transponder 28, in accordance with an embodiment of the present invention. In this example, transponder 28 takes the form of a thin and flexible label. In one non-limiting example, the label has a size of approximately 3 by 5 inches and the label is less than 1 mm thick. The same basic design structure can be used in different forms and sizes of battery assisted RFID transponders. The upper side of FIG. 8 corresponds to the side of the label that is attached to the tracked object.

The figure shows substrate 48, which can optionally be any suitable substrate as described hereinabove. In some embodiments, substrate is polyester, such as but not limited to polyester 75 micron. Antenna 52 is deposited on substrate 48. The antenna in this example is the monopole antenna shown in FIG. 3B, which is printed as a metallic layer on substrate 48. Both active element 94 and ground plane 96 can be clearly seen in the figure. In addition to the antenna, the printed metallic layer comprises conductors that interconnect IC 56 with battery 60 and antenna 52 once they are attached to the substrate. Battery 60, in this case a Power Paper® battery type STD-3 or STD-4, is attached in a suitable location on top of ground plane 96. The battery terminals are connected to the printed conductors by a suitable connection means, such as by using a suitable electrically-conductive adhesive 185. IC 56 is attached in a suitable location on the substrate and interconnected with the battery and the antenna.

The substrate and the components mounted on it are attached to a liner 186, such as but not limited to a silicone liner, using for example a double-sided adhesive 187. When attaching transponder 28 to package 24 or other tracked object, the silicone liner can be peeled off, and the transponder attached to the object using the double-sided adhesive.

A front liner 188 is attached to the bottom side of surface 48. In some embodiments, the front liner comprises adhesive polyethylene, a suitable double-sided adhesive tape. Alternatively, any other suitable liner can be used. In some embodiments, a graphic label 189 can be attached to the front liner. Label 189 may comprise any relevant textual or graphical information, such as a company logo or a bar-code.

In some embodiments, additional layers, such as adhesive layers (not shown in figure) are applied, which are configured to facilitate uniform thickness of the transponder label.

In an alternative embodiment, release liner 186 can be disposed on the distal side of substrate 48. However, this configuration is not always suitable due to the proximity of antenna 52 to the packaging of the tracked object.

The resulting transponder structure is small, flat and flexible, enabling it to easily attach to different objects and to conform to the shape of the object. In sufficiently large volumes, such label is low-cost and can be disposed of after use.

Figure 9:
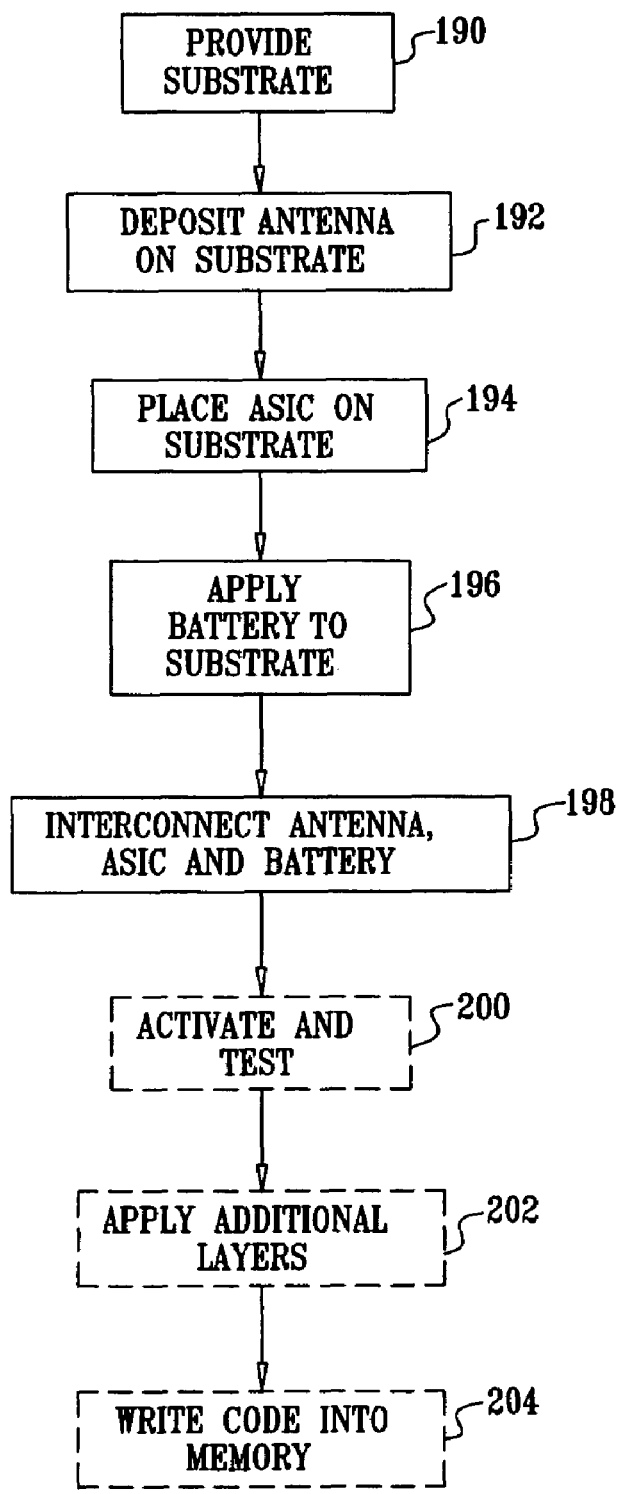
FIG. 9 is a flow chart that schematically illustrates a method for producing an RFID transponder, in accordance with an embodiment of the present invention.

FIG. 9 is a flow chart that schematically illustrates a method for producing RFID transponder 28, in accordance with an embodiment of the present invention. A substrate 48 is provided, at a substrate provisioning step 190. Substrate 48 can typically be made of a material such as polyester or paper. Other examples of substrate materials include woven materials, non-woven materials, polymers, conducting materials, non-conducting materials, cardboard, plastic, synthetic materials, natural materials, fabrics, metals, wood, glass, Perspex, a combination thereof or any other suitable material.

Optionally, substrate 48 can be made up of a plurality of substrate base layers that are stacked or connected in a co-planar way by any suitable attachment methodology. In an embodiment, in which substrate 48 comprises a plurality of base layers, each of the antenna, IC and battery can optionally be attached to a different substrate base layer. Optionally, substrate 48 can be of any suitable size, shape or color.

In one embodiment, substrate 48 can be made integral with the tracked object or its packaging. For example, substrate 48 can be made an integral part of a cardboard box, wooden crate, metal crate, plastic box, metal can, car, etc. In such a way, transponder 28 can be produced directly onto an end-product material, which can then optionally be further processed to form the tracked object or its packaging. This embodiment facilitates an integrated RFID transponder.

In some embodiments, substrate 48 can be implemented to comprise a suitable attachment means, which readily facilitate attaching transponder 28 to the tracked object or its packaging. The attachment means may comprise but are not limited to, adhesive, self adhesive label, hook and loop fastening systems (such as Velcro®), magnetic attachment, suction attachment, ties and combinations thereof.

Antenna 52 is deposited onto substrate 48, at an antenna deposition step 192. The antenna may be deposited using a thick-film deposition method, an etching process, by attaching a metallic foil or template cut to the appropriate shape, by printing a suitable electrically-conductive ink, using a vaporization method, or using any other suitable deposition method. In some embodiments, antenna 52 is deposited on the substrate using a suitable printed circuit board (PCB) manufacturing process. In these embodiments, substrate 48 comprises a suitable PCB material with a metallic layer disposed thereon.

IC 56 is placed on substrate 48, at an IC placement step 194. The IC may be soldered, glued or otherwise attached to the substrate using any other suitable means. In one embodiment, the IC is interconnected with conductors disposed on the substrate using "flip-chip" technology, as is known in the art. In this embodiment, the flip-chip interconnections function as the mechanical attachment means as well. The conductors may be deposited on the substrate together with the antenna at step 192. Typically, the location of the IC is chosen to be as close as possible to feed point 92 of antenna 52, so as to maintain the desired impedance match or mismatch and to minimize signal losses.

In an alternative embodiment, IC 56 may comprise an organic polymer electronic chip, as known in the art. Such a polymer chip is printable and can be printed directly on substrate 48. The use of such a chip can facilitate production of a fully printable transponder, in which the battery, connectors, antenna and chip can be printed onto the substrate.

In still a further alternative embodiment, a plurality of discrete components can be used instead of IC 56. Such discrete components can preferably be produced using a printing technology and can be printed on substrate 48. The printable discrete components can facilitate production of a fully printable transponder.

Battery 60 is applied to substrate 48, at a battery application step 196. The battery can be mechanically attached to the substrate at any suitable location and using any suitable attachment means, such as gluing, crimping or soldering. In some embodiments, the location of battery 60 is chosen so as to minimize interference with the radiation pattern of antenna 52. For example, in the mechanical configuration shown in FIG. 8 above, the battery is attached over the area of ground plane 96, so as to minimize the effect on the radiation pattern of the monopole antenna.

Figure 10A:
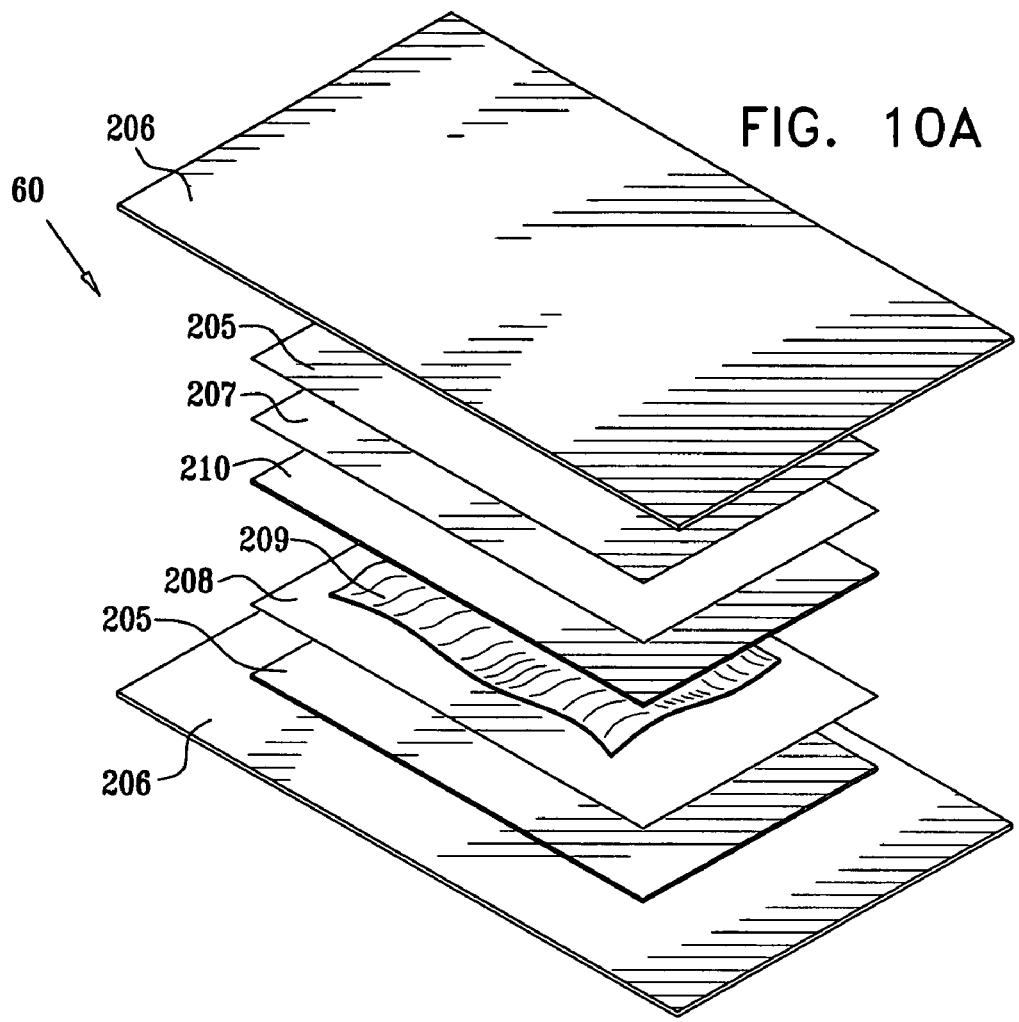
FIG. 10A is a schematic exploded view of a printed battery, in accordance with an embodiment of the present invention.
Figure 10B:
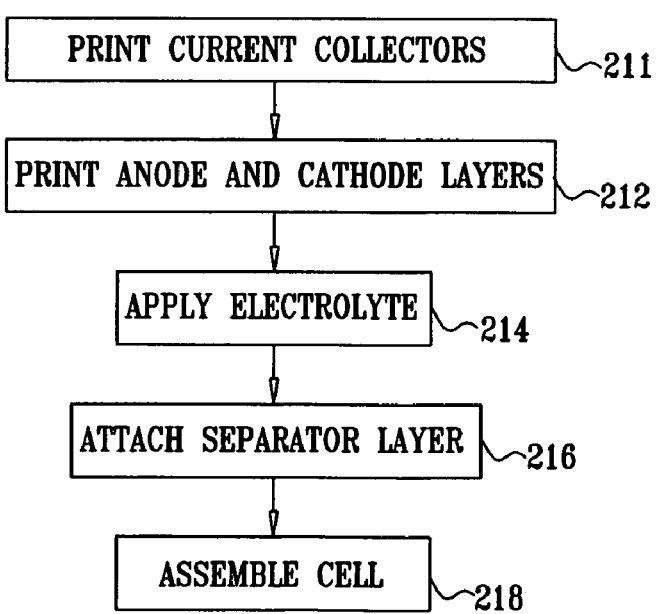
FIG. 10B is a flow chart that schematically illustrates a method for producing a printed battery for a transponder, in accordance with an embodiment of the present invention.

In some embodiments, when battery 60 comprises a thin and flexible battery such as the Power Paper batteries described above, the different layers of battery 60 can be deposited or printed on substrate 48 as an integral part of the transponder production process. In one exemplary embodiment, substrate 48 of the transponder serves as the substrate for one of the electrodes of battery 60, and another substrate is used for the second electrode. An exemplary battery and a method for producing such a battery are shown in FIGS. 10A and 10B below. Alternatively, a thin and flexible battery can be assembled separately and then attached to substrate 48.

In one optional embodiment, part of the battery may be used as part of or in place of antenna 52. For example, the conductive material of one or both of the battery electrode layers can function as part of the antenna.

Having deposited the antenna, IC and battery on the substrate, the three components are interconnected, at an interconnection step 198. Interconnection of the IC may use any suitable IC interconnection means, such as "flip-chip" methods and wire bonding. Battery 60 can be interconnected with the other transponder components by direct soldering, using PCB conductors or using any other suitable connection means.

In some embodiments, the transponder is activated and tested as soon as the antenna, IC and battery are interconnected, at a testing step 200.

Optionally, additional layers are added to the transponder, at a packaging step 202. For example, top and bottom liners can be added in order to improve the mechanical durability of the transponder and to facilitate the attachment of the transponder to the tracked object. In some embodiments, an additional layer is applied underneath substrate 48, in order to introduce additional separation between antenna 52 and the surface of the tracked object. This added separation may be needed, for example, when the tracked object is metallic, for reducing interference from the tracked object to the radiation pattern of the antenna. In some cases, an external lamination is applied to the transponder. Additional items such as a bar-code or graphical label can also be added at this stage.

Optionally, the code is written into memory 66 of the transponder, at an ID writing step 204. Alternatively, the code may be pre-programmed into the memory or stored in the memory at a later stage.

Note that steps 190-204 above can be executed in different orders. For example, when battery 60 is fabricated as part of the transponder production process, step 196 is inherently simultaneous with step 198. As another example, testing step 200 can also be executed after packaging step 202, when the transponder is fully assembled.

In some embodiments, transponder 28 is particularly suitable for manufacturing using a continuous, fully-automated, printing, drying and laminating process. In some embodiments, a roll-to-roll process, is used. Such a roll-to-roll process is capable of efficiently mass-producing transponders 28. The method described by steps 190-204 above can be readily adapted to different transponder configurations and to different manufacturing volumes and technologies.

FIG. 10A is a schematic exploded view of a printed battery, in accordance with an embodiment of the present invention. The printed battery of FIG. 10A is a thin and flexible 1.5 V cell, which can be used as battery 60 of transponder 28. Some of the battery elements are printed using certain inks having the desired chemical composition. Similar batteries and production methods are also described in detail in U.S. Pat. Nos. 5,652,043, 5,897,522 and 5,811,204 cited above.

In this embodiment, battery 60 comprises two current collectors 205 applied to substrates 206. An anode layer 207 is applied to one current collector and a cathode layer 208 is applied to the other current collector. An electrolyte 209 is applied to anode layer 207, to cathode layer 208, or to both. A separator layer 210 is inserted between the anode and cathode layers.

FIG. 10B is a flow chart that schematically illustrates an exemplary method for producing battery 60 of FIG. 10A, in accordance with an embodiment of the present invention. The method described below can be used to implement battery application step 196 of the transponder production method of FIG. 9 above. In some embodiments, the battery is manufactured separately and then integrated into the transponder. In other embodiments, the battery is printed and fabricated on the same substrate as transponder 28, as an integral part of the transponder production method.

The method comprises printing current collectors 205, at a current collector printing step 211. Typically, two current collectors are printed, one for collecting the anode current and one for collecting the cathode current. The collectors are printed on suitable substrates 206, such as polyester substrates. (When the battery is printed as part of the transponder production process, substrate 48 of the transponder can serve as one of substrates 206.) In some embodiments, the current collectors comprise a layer of current collector ink, for example Current Collector Ink 2501, P/N 0002.25.01, produced by Power Paper Ltd. The current collectors are typically dried after printing using suitable drying means, such as an oven.

Anode layer 207 and cathode layer 208 are printed on top of the current collectors, at an electrode printing step 212. Anode layer 207 typically comprises a suitable anode ink, for example a zinc anode ink such as Anode Ink 2101, P/N 0002.21.01, produced by Power Paper Ltd. Cathode layer 208 typically comprises a suitable cathode ink, for example a manganese dioxide ($MnO_2$) ink such as Cathode Ink 2201, P/N 0002.22.01, produced by Power Paper Ltd. After printing, the anode and cathode layers are typically dried after printing using suitable drying means, such as an oven.

Electrolyte 209 is applied by any suitable means at an electrolyte applying step 214. The electrolyte can be applied to anode layer 207, to cathode layer 208, or to both. In some embodiments, particularly when a stencil printing process is used, electrolyte 209 may comprise an electrolyte ink such as Electrolyte 2301, P/N 0002.23.01, produced by Power Paper Ltd. In other embodiments, particularly when a screen printing process is used, electrolyte 209 may comprise an electrolyte ink such as SP Electrolyte 2302, P/N 0002.23.02, produced by Power Paper Ltd. In some embodiments, electrolyte layer 208 comprises zinc chloride. Alternatively, any other suitable electrolyte material can be used.

Separator layer 210 is placed on top of the electrolyte layer of either the anode layers or cathode layers, at a separator insertion step 216. The separator layer separates the anode layer from the cathode layer, while allowing ion conductivity between the electrodes. Typically, the separator layer comprises a porous insoluble substance, such as, but not limited to, filter paper, plastic membrane, cellulose membrane, cloth or non-woven material (e.g., cotton fibers).

In an alternative embodiment, separator layer 210 can self-form as a result of a reaction and/or an interaction between materials in the two electrolyte layers.

The battery is assembled at a cell assembly step 218. In some embodiments, this step can include applying an adhesive frame, such as a pressure sensitive glue frame, which can be applied onto the edge of the single cell substrate. This step can further include laminating the electrode layers with the separator to the opposite electrode layer without the separator. In such a way the substrates, current collectors, electrodes, electrolyte and separator layers are stacked in the manner shown in FIG. 10A above. In some embodiments, a press, such as but not limited to a hot press, is used to press the glue frame for optimal adherence of the glue frame.

In some embodiments, connectors can be attached to the current collectors as part of or following the cell assembly step. The connectors may comprise, for example, metallic tabs or strips, double-sided conductive adhesive tape and heat-sealed connectors.

IMPLEMENTATION EXAMPLES

Reference is now made to the following two examples, which together with the above descriptions illustrate the invention in a non-limiting fashion. The following table provides an exemplary specification of a transponder 28, in accordance with an embodiment of the present invention:

| Parameter | Specification |
| --- | --- |
| Operating frequency | 860-880 and 902-928 MHz |
| Frequency hopping operation | As authorized for the reader |
| Optimized antenna RCS | $\sigma/\lambda^2 = 1$ m$^2$ for a 10 × 10 cm label area |
| Optimized antenna ΔRCS | $\Delta\sigma/\lambda^2 = 0.9$ RCS |
| Free space read and write range with reader effective isotropic radiated power (EIRP) = 4 Watt | 30 m |
| Reader to transponder modulation | ASK, DSB, SSB, FSK or PSK |
| Transponder to reader modulation | ASK or subcarrier PSK |
| Reader to transponder data rate | 4.8-128 kbit/sec |
| Transponder to reader data rate | 4.8-512 kbit/sec |
| Reader to transponder coding | NRZ, Miller, PIE or PWM |
| Transponder to reader coding | direct or subcarrier, NRZ, FM0 or Miller |
| Basic non-volatile (EEPROM) memory organization: | |
| UID | 64-196 Bits |
| System Memory | 128 Bits |
| Passwords and CRC | 64 Bits |
| User Memory | 120 Bits |
| Operating temperature | −20-+60° C. |
| Non-damaging RF input at the antenna terminal | ≦+20 dbm |

An exemplary implementation of transponder 28, in the form of a label, was tested in different operating environments. In each environment, the reading reliability (percentage of successful interrogations) and reading range were measured. The following table shows non-limiting examples of test results for several challenging environments. All tests used a reader 32 having a single antenna. In particular, some of the test environments included foils and other metallic objects in the vicinity of the transponder. Nevertheless, 100% reading reliability was achieved in nearly all environments, as can be seen in the table:

| Tracked object | Test scenario | Reading Reliability (% of labels read) | Reading Range (feet) |
|---|---|---|---|
| Metal containers filled with fragrance liquid | Outdoor loading/unloading area | 100% | Up to 30 feet |
| Aluminum foil juice boxes | Distribution center; reader on truck door; 100 boxes on metal roll containers; container-level tagging | 100% | 10 feet |
| Canned food | Distribution center; reader on truck door; 100 boxes on metal roll containers; container-level tagging | 100% | 10 feet |
| Ice cream (at −30° C.) | Distribution center; reader on truck door; 100 boxes on metal roll containers; container-level tagging | 100% | 10 feet |
| Mixed goods (e.g., spaghetti sauce, metallic coffee canisters, spicy sauce in aluminum foil) | Reader/gate scenario. Several labels in and around boxes on a pallet | 100% | 10 feet |
| Dishwashing detergent | Reader/gate scenario. Labels placed around a box holding boxes of detergent | 100% | 10 feet |
| Baby wipes | Labels sandwiched in between individual items | 100% | 10 feet |
| Cigarette packs (aluminum foil) | Item level; one label per pack; conveyer belt test | 98% | N/A |
| Beverages (wine, soda cans, etc.) | Item level; one label per bottle/can | 100% | N/A |
| Oil lubricant bottles | Item level on pallet in several layers | 100% | 23-30 feet |
| Condensed dog food (22 lb. bags) | Item level | 100% | 32 feet |
| Wooden blocks | Multiple tags staggered on three level wood blocks | 100% | Up to 40 feet |

Although the methods and devices described herein mainly address battery-assisted UHF backscatter RFID transponders, the principles of the present invention can be used for additional applications, as well. Such applications include, for example, electronic article surveillance (EAS) systems and authentication applications in EAS systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for using a radio frequency (RF) transponder comprising a flexible substrate supporting a battery for operating the transponder and an antenna adapted to backscatter RF interrogation radiation that is transmitted from an interrogation device; the method comprising:
   bending the substrate so that the battery is oriented in a first plane and the antenna is oriented in a second plane different from the first plane; and
   attaching the substrate to adjacent surfaces of an object so as to wrap the transponder around a corner of the object.

2. A method for manufacturing a radio frequency (RF) transponder, comprising:
   providing a substrate;
   applying on the substrate an antenna suitable for backscattering radio-frequency (RF) radiation;
   applying an integrated circuit (IC) to the substrate, and coupling the IC to vary a radiation characteristic of the antenna so as to modulate information onto the backscattered radiation; and
   printing a battery on the surface of the substrate by printing one or more battery layers in at least one of a co-facial configuration and a co-planar configuration using respective inks comprising battery layer materials, so as to provide electrical power for powering the transponder.

3. The method according to claim 2, wherein the layer material comprises at least one of zinc, manganese dioxide ($MnO_2$) and zinc chloride ($ZnCl_2$).

4. The method according to claim 2, wherein printing the battery comprises:
   forming a first battery assembly comprising:
      printing a first electrode layer on the surface of the substrate;
      applying an electrolyte on the first electrode layer; and
      applying a separator layer on the electrolyte of the first electrode layer;

forming a second battery assembly comprising:
  printing a second electrode layer of opposite polarity to the first electrode layer on a second substrate; and
  applying the electrolyte on the second electrode layer; and
joining together the first battery assembly and second battery assembly so that the layers are stacked and the electrolyte of the second electrode layer is in co-facial contact with the separator layer.

5. The method according to claim 2, wherein applying the antenna comprises printing the antenna on the substrate.

6. The method according to claim 2, wherein the IC comprises an organic polymer IC and wherein applying the IC comprises using a printing technique to apply the IC.

7. The method according to claim 6, wherein applying the antenna and the IC and printing the battery comprise printing a fully printable transponder.

8. The method according to claim 2, wherein the substrate is flexible.

9. The method according to claim 2, wherein the transponder has a thickness no greater than 1 mm and a bending radius no greater than 25 mm.

10. The method according to claim 2, wherein the transponder is suitable for attaching around a corner of an object so that the battery is oriented in a first plane and the antenna is oriented in a second plane different from the first plane.

11. The method according to claim 2, wherein the antenna is operative in one of an ultra-high frequency (UHF) range and a microwave frequency range.

12. The method according to claim 2, wherein the substrate comprises a substrate of a tracked object or packaging of the tracked object, facilitating an integrated transponder wherein the transponder substrate is integral with the tracked object or packaging.

13. The method according to claim 2, wherein the substrate comprises an attachment means.

14. The method according to claim 2 wherein the IC is applied onto the substrate close to a feed point of the antenna.

15. The method according to claim 2, wherein the battery is disposed on the substrate at a location to minimize interference with a radiation pattern of the antenna.

16. The method according to claim 2, wherein the antenna is at least partially constituted by the battery.

17. The method according to claim 2, further comprising applying to the transponder at least one in the group of: top liners, bottom liners, an additional layer under substrate, external lamination, a bar code and a graphical label.

18. The method according to claim 2, using a roll-to-roll manufacturing process.

19. A method for manufacturing a radio frequency (RF) transponder, comprising: providing a substrate; applying on the substrate an antenna suitable for backscattering radio-frequency (RF) radiation; applying an integrated circuit (IC) to the substrate, and coupling the IC to vary a radiation characteristic of the antenna so as to modulate information onto the backscattered radiation; and printing a battery on the surface of the substrate, so as to provide electrical power for powering the transponder, wherein printing the battery comprises printing one or more battery layers in at least one of a co-facial configuration and a co-planar configuration using respective inks comprising battery layer materials and wherein printing the battery comprises: forming a first battery assembly comprising: printing a first electrode layer on the surface of the substrate; applying an electrolyte on the first electrode layer; and applying a separator layer on the electrolyte of the first electrode layer; forming a second battery assembly comprising: printing a second electrode layer of opposite polarity to the first electrode layer on a second substrate; and applying the electrolyte on the second electrode layer; and joining together the first battery assembly and second battery assembly so that the layers are stacked and the electrolyte of the second electrode layer is in co-facial contact with the separator layer.

20. A method for manufacturing a radio frequency (RF) transponder, comprising: providing a substrate; applying on the substrate an antenna suitable for backscattering radio-frequency (RF) radiation; applying an integrated circuit (IC) to the substrate, and coupling the IC to vary a radiation characteristic of the antenna so as to modulate information onto the backscattered radiation; and printing a battery on the surface of the substrate, so as to provide electrical power for powering the transponder; wherein providing the substrate includes forming the substrate so as to be suitable for attaching around a corner of an object so that the battery is oriented in a first plane and the antenna is oriented in a second plane different from the first plane.

* * * * *